(12) United States Patent
Saito

(10) Patent No.: US 7,093,295 B1
(45) Date of Patent: Aug. 15, 2006

(54) METHOD AND DEVICE FOR PROTECTING DIGITAL DATA BY DOUBLE RE-ENCRYPTION

(76) Inventor: Makoto Saito, 2-12-6-104, Kaitori, Tama-shi, Tokyo (JP)

( * ) Notice: Subject to any disclaimer, the term of this patent is extended or adjusted under 35 U.S.C. 154(b) by 0 days.

(21) Appl. No.: 09/806,510

(22) PCT Filed: Oct. 15, 1999

(86) PCT No.: PCT/JP99/05704

§ 371 (c)(1),
(2), (4) Date: Apr. 16, 2001

(87) PCT Pub. No.: WO00/22777

PCT Pub. Date: Apr. 20, 2000

(30) Foreign Application Priority Data

Oct. 15, 1998 (JP) ................................. 10/309418

(51) Int. Cl.
H04L 9/00 (2006.01)
(52) U.S. Cl. .................... 726/26; 726/27; 726/30; 380/200; 380/201; 380/277
(58) Field of Classification Search ........ 380/200–203, 380/239; 713/200
See application file for complete search history.

(56) References Cited

U.S. PATENT DOCUMENTS

| | | |
|---|---|---|
| 5,138,659 A | 8/1992 | Kelkar et al. |
| 5,301,245 A | 4/1994 | Endoh |
| 5,353,351 A | 10/1994 | Bartoli et al. |
| 5,381,480 A | 1/1995 | Butter et al. |
| 5,475,757 A | 12/1995 | Kelly |

(Continued)

FOREIGN PATENT DOCUMENTS

JP 7-272399 10/1995

(Continued)

OTHER PUBLICATIONS

Fields, S.E., 'Hardware Design and Implementation of Role-Based Cryptography', Dec. 2005, Univ. of Tennessee, entire document, http://microsys6.engr.utk.edu/ece/thesis-sfields.pdf.*

(Continued)

*Primary Examiner*—Ayaz Sheikh
*Assistant Examiner*—Ronald Baum
(74) *Attorney, Agent, or Firm*—Berkeley Law & Technology Group, LLC

(57) ABSTRACT

A method and an apparatus ensuring protection of digital data are provided. In addition to re-encrypting the data using an unchangeable key, the data is double re-encrypted using a changeable key. The changeable key is used first and the unchangeable key is then used, or in another case, the unchangeable key is used first, and the changeable key is then used. In the aspect of embodiments, there is a case adopting a software, a case adopting a hardware, or a case adopting the software and the hardware in combination. The hardware using the unchangeable key developed for digital video is available. In adopting the software, encryption/decryption is performed in a region below the kernel which cannot be handled by the user to ensure the security for the program and for the key used. More concretely, encryption/decryption is performed with RTOS using a HAL and a device driver, i.e., a filter driver, a disk driver and a network driver, in an I/O manager. Either one of two filter drivers, with a file system driver between them, may be used. Further, both filter drivers may be used.

92 Claims, 14 Drawing Sheets

U.S. PATENT DOCUMENTS

| | | | |
|---|---|---|---|
| 5,479,514 A | | 12/1995 | Klonowski |
| 5,504,816 A | | 4/1996 | Hamilton et al. |
| 5,504,818 A | | 4/1996 | Okano |
| 5,515,441 A | | 5/1996 | Faucher |
| 5,553,139 A | * | 9/1996 | Ross et al. .................... 705/59 |
| 5,689,561 A | * | 11/1997 | Pace .......................... 705/55 |
| 5,825,879 A | * | 10/1998 | Davis ........................ 380/216 |
| 6,398,245 B1 | * | 6/2002 | Gruse et al. ................ 280/228 |

FOREIGN PATENT DOCUMENTS

| | | |
|---|---|---|
| JP | 8-125651 | 5/1996 |
| JP | 8-185448 | 7/1996 |
| JP | 10-271105 | 10/1998 |
| JP | 11-275516 | 10/1999 |

OTHER PUBLICATIONS

Nikkei Electronics No. 724, pp. 101-110, Aug. 24, 1998.

Bruce Schneier, Applied Cryptographic, 2nd. Edition, pp. 357-368.

S. Miyaguchi et al.; Review of the Electrical Communications Laboratories, vol. 36, No. 4, pp. 433-437; 1988.

I. Oyaizu et al.; 91—DPS—48, vol. 91, No. 8, Jan. 24, 1991.

Gale, B. and Baylin, F., Scrambling and Descrambling, Satellite and Cable TV 2nd Ed, Baylin/Gale Productions 1986 Boulder CO, pp. 163-165.

* cited by examiner

METHOD AND DEVICE FOR PROTECTING DIGITAL DATA BY DOUBLE RE-ENCRYPTION

FIELD OF THE INVENTION

The present invention relates to a system for managing digital contents. In particular, the present invention relates to a system used for managing copyrights of digital content, for which copyrights are claimed, and for protecting the secrecy of the digital content so as to achieve enhanced digital content distribution and to realize digital content commerce.

PRIOR ART

Hitherto, widely spread analog content deteriorate in quality each time it is stored, copied, edited and transferred. Hence, no serious detriment from copyright violations occurs during these operations. However, digital content does not deteriorate in quality after repeated storing, coping, editing and transferring. Thus, the control of digital content copyright is an important issue.

Digital data such as digital video data, digital audio data, etc. is usually supplied to users on a payment basis accompanying a broadcast, transfer of a DVD, etc. In these cases, the data is encrypted and supplied in a manner which excludes unpaid viewing. The encrypted and supplied digital data is decrypted using a crypt key, which is supplied to the user by certain means, before the data is viewed. Because the quality of decrypted digital data does not deteriorate even when it is stored, copied or transferred, if the data is stored, copied or transferred by the user, secondary viewing free of charge may occur. Non-authorized re-use of the decrypted digital data content is against the benefit of the data content provider. In this respect, systems and equipment have been developed to prohibit re-use, i.e., secondary utilization such as storing, copying or transferring the digital data content.

However, the prohibition of the secondary utilization makes it less attractive for users of the digital data content and it is now recognized that this may hinder the propagation of the use of the digital data content. In this respect, it is now proposed to prevent illegitimate use by re-encrypting the decrypted digital data content so that the use of the digital data content is more attractive for users.

When the digital data, which is stored in a medium and is given or lent to a user or which is transferred to the user, is used for secondary utilization such as storing, copying or transferring, it is impossible for the copyright owner to protect his or her copyright(s) in the digital data, which is in the hands of the users. Therefore, a certain method is required to protect copyrights automatically and forcibly.

Under such circumstances, the present inventor has made various proposals with the purpose of protecting digital content copyrights.

In Japanese Patent Laid-Open Publications 46419/1994 (GB-2269302; U.S. Ser. No. 08/098,415) and 141004/1994 (U.S. Pat. No. 5,794,115; U.S. Pat. No. 5,901,339), the present inventor proposed a system for managing copyrights by obtaining a permit key from a key control center via a public telephone line, and also, an apparatus for such a purpose in Japanese Patent Laid-Open Publication 132916/1994 (GB-2272822; U.S. Ser. No. 08/135,634).

Also, in Japanese Patent Laid-Open Publications 271865/1995 (EP0677949A2; U.S. Ser. No. 08/416,037) and 185448/1996 (EP0704785A2; U.S. Ser. No. 08/536,747), a system for copyright management of the digital contents was proposed.

In these systems and apparatus, those who wish to view an encrypted program makes a viewing request to a management center via a communication line using a communication device. Upon receipt of the viewing request, the management center transmits a permit key and charges and collects a fee.

Upon receipt of the permit key, the requestor transmits the permit key to a receiving device by on-line or off-line means. When the permit key is received, the receiving device decrypts the encrypted program by using the permit key.

The system described in Japanese Patent Laid-Open Publication 271865/1995 (EP0677949A2; U.S. Ser. No. 08/416,037), uses a program for managing the copyright and copyright information, in addition to a key for use permission, to manage the copyright of the digital content in displaying (including process to sound), storing, copying, editing and transferring the digital contents, including real-time transmission of digital video content, in a database system. The program for copyright management watches and manages in a manner that the digital content is not used outside the use permission or user's request.

Japanese Patent Laid-Open Publication 271865/1995 (EP0677949A2; U.S. Ser. No. 08/416,037) describes that the digital content is supplied from a database in the encrypted state and is decrypted by the copyright management program only when it is displayed or edited, and is again in the encrypted state when it is stored, copied or transferred. Further, it describes that the copyright management program itself is encrypted and is decrypted by using a permit key, and the decrypted copyright management program performs decryption and encryption of the copyrighted data, and that, when a utilization other than storing and displaying the data is performed, copyright information including information of the person who performed the utilization is added to the original copyright information and stored as history.

Japanese Patent Laid-Open Publication 287014/1996 (U.S. Pat. No. 5,867,579; EP0715241A2) proposed an apparatus for decryption/re-encryption having a configuration of a board, a PCMCIA card, an IC card or an IC for the copyright management and a crypt key escrow system. This application also describes the copyright management method applied to a video conference system and an electronic commerce system. U.S. Pat. No. 5,805,706, also describes an apparatus for decryption/re-encryption having an IC configuration.

Japanese Patent Laid-Open Publication 272745/1996 (U.S. Pat. No. 5,646,999; EP0709760) proposed a system, in which the copyright of original data and the copyright of new data produced by editing the original data or editing a plurality of original data are protected by confirming the validity of a use request based on a digital signature on an edit program, in combination with the use of a secret-key cryptosystem and a public-key cryptosystem.

Japanese Patent Laid-Open Publication 288940/1996 (U.S. Pat. No. 5,740,246; EP0719045A2) proposed various forms for applying the copyright management system to a database system, a video-on-demand (VOD) system or an electronic commerce system.

Japanese Patent Laid-Open Publication 329011/1996 (U.S. Pat. No. 5,848,158; EP0746126A2) proposed a system, in which copyrights of original data and new data are protected by using a third crypt key and a copyright label in case of using and editing a plurality of data.

As it can be understood from the data copyright management systems and the data copyright management apparatus proposed by the present inventor as described above, the management of data copyrights can be accomplished by encryption/decryption/re-encryption and limiting usage of digital content by the copyright management program. The cryptography technique and usage limitation can be realized by using a computer.

In a case where secret information is exchanged via a network, the information is encrypted for preventing piracy.

It is described in U.S. Pat. No. 5,504,818 and U.S. Pat. No. 5,515,441 that information piracy during transmission is prevented by encryption. Using a plurality of keys in such a case is described in U.S. Pat. Nos. 5,504,816, 5,353,351, 5,475,757 and 5,381,480, and performing re-encryption is described in U.S. Pat. No. 5,479,514.

The protection of copyrights in the secondary utilization of digital data by the copyright management program can be realized by re-encryption/re-decryption of the decrypted digital data and by managing and performing the re-encryption/re-decryption by using the copyright management program.

Of course, it goes without saying that the means for carrying out re-encryption/re-decryption includes cases where software is used and cases where hardware is used.

Here, the operation to obtain encrypted data C from non-encrypted data M by using a key K is expressed as:

$C=E(M,K)$, and to obtain decrypted data M from encrypted data C by using the key K is expressed as:

$M=D(C,K)$.

When re-encryption/re-decryption of the decrypted data M is repeated, re-encryption is expressed as:

$\forall i: C_i = E(D(C_{i-1}, K_{i-1}), K_i)$, where i is a positive integer, and re-decryption is expressed as:

$\exists: M = D(E(C_{i-1}, K_{i-1}), K_i)$.

Referring to FIG. 1, description will be given on an arrangement of a conventional set-top box (STB) and on a method for protecting the digital data performed in the set-top box.

Description is not given here on peripheral circuits not directly related to encryption/decryption, e.g., the description for an amplifier unit and a compression/expansion unit is omitted.

In FIG. 1, reference numeral 1 represents digital data supplied by broadcasting means such as digital terrestrial wave broadcasting, digital CATV broadcasting, digital satellite broadcasting, etc., by network means such as the Internet, or by a digital storage medium such as a DVD, a CD, etc. The data is encrypted by using a first changeable key K1 to prevent illegitimate use:

$C1=E(M,K1)$ and is supplied to a set-top box 2.

When the encrypted digital data C1 is supplied to the set-top box 2, the encrypted digital data C1 is decrypted by a decryption unit 3 using the first changeable key K1 obtained from a key center via the same route as or via a different route from that of the encrypted digital data C1:

$M=D(C1,K1)$ and data M thus decrypted is outputted to a display unit 4 or the like.

In a case where the decrypted data M is stored in a medium such as a digital versatile disk (DVD) RAM or a hard disk, etc., or it is transferred externally via a network, the decrypted data M is re-encrypted by an encryption unit 6 within an unchangeable key encryption/decryption unit 5, using an unchangeable key K0:

$\nabla 0: C0 = E(M, K0)$ $= E(D(C1, K1), K0)$ and re-encrypted data C0 is stored in or transferred to an external device 8.

In a case where the re-encrypted data C0 is used again, the re-encrypted data C0 read from a storage medium of the external device 8 or transferred via the network is re-decrypted using the unchangeable key K0 by a decryption unit 7 of the unchangeable key encryption/decryption unit $\exists: M = D(C0, K0)$ $= D(E(D(C1, K1), K0)$ and the decrypted data M is outputted to the display unit 4 or the like.

In this case, in order to ensure security, it may be arranged in such a manner that the re-encrypted data C0 in the storage medium is erased when the re-encrypted data C0 is read from the storage medium via a route shown by a broken line in the figure and that the data re-encrypted again by using the unchangeable key K0 is re-stored.

In U.S. Pat. No. 5,805,706, an integrated circuit for performing re-encryption/re-decryption is described.

In the set-top box as arranged above, it is easy to handle because re-encryption/re-decryption is automatically carried out by the hardware by using the unchangeable key K0, and it is effective for forcible re-encryption/re-decryption of the digital data, which must be protected.

However, since the unchangeable key K0 is placed in the device, and since there is the possibility that the unchangeable key K0 may be known to others, it may become impossible to protect the digital data thereafter.

SUMMARY OF THE INVENTION

To solve the above problem, the present invention provides a method and an apparatus for double re-encrypting the data by using a changeable key in addition to re-encrypting by using an unchangeable key.

In use of the unchangeable key and the changeable key, there are cases where the changeable key is used first and the unchangeable key is then used, and where the unchangeable key is used first and the changeable key is then used.

The key used first when re-encrypting is the final key used when decrypting, and accordingly, even if data, which is subsequently re-encrypted, is cryptanalyzed, security is highly ensured. Therefore, in a case where a changeable key is used first and an unchangeable key is next used for re-encryption, the possibility that the changeable key is known to others is very low even when the unchangeable key has been known to the others.

In the aspects of the embodiments of the present invention, software and/or hardware may be used. In an embodiment using hardware, hardware using the unchangeable key developed for digital video can be used.

In an embodiment using software, in order to ensure the security of the program and the key used, encryption/decryption is performed in a region under a kernel which cannot be handled by users. More concretely, encryption/decryption is performed at a filter driver, a device driver, i.e., a disk driver/network driver, and a real-time OS using HAL in an I/O manager. There are two filter drivers with a file system driver interposed between them, and either one of the filter drivers may be used, or both may be used.

DETAILED DESCRIPTION OF THE PREFERRED EMBODIMENTS

The following describes embodiments of the present invention.

Figure 2:
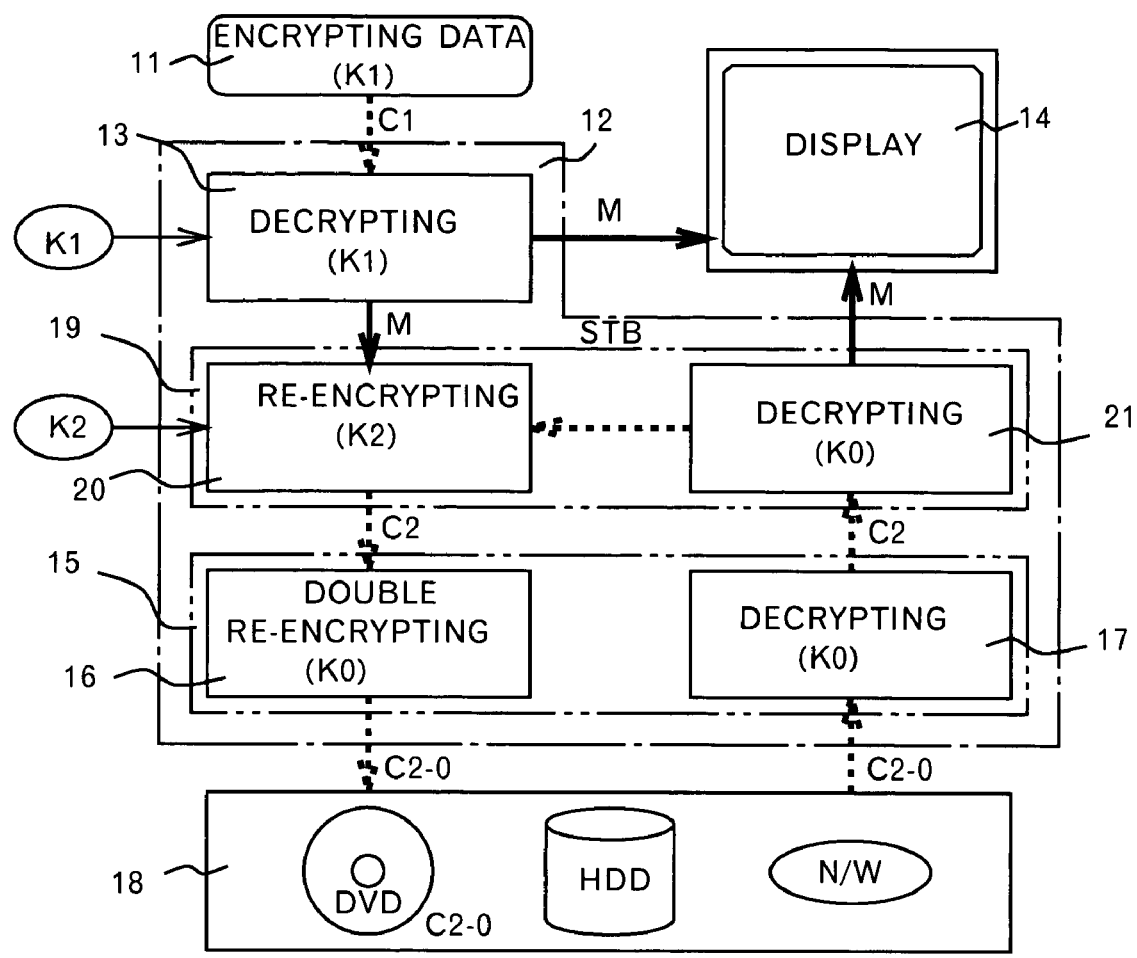
FIG. 2 shows a general arrangement of a first embodiment of the present invention applied to a set-top box.

Referring to FIG. 2, description will be given on an arrangement of a set-top box (STB) of a first embodiment of the present invention, and a method for protecting the digital data in the set-top box.

Figure 1:
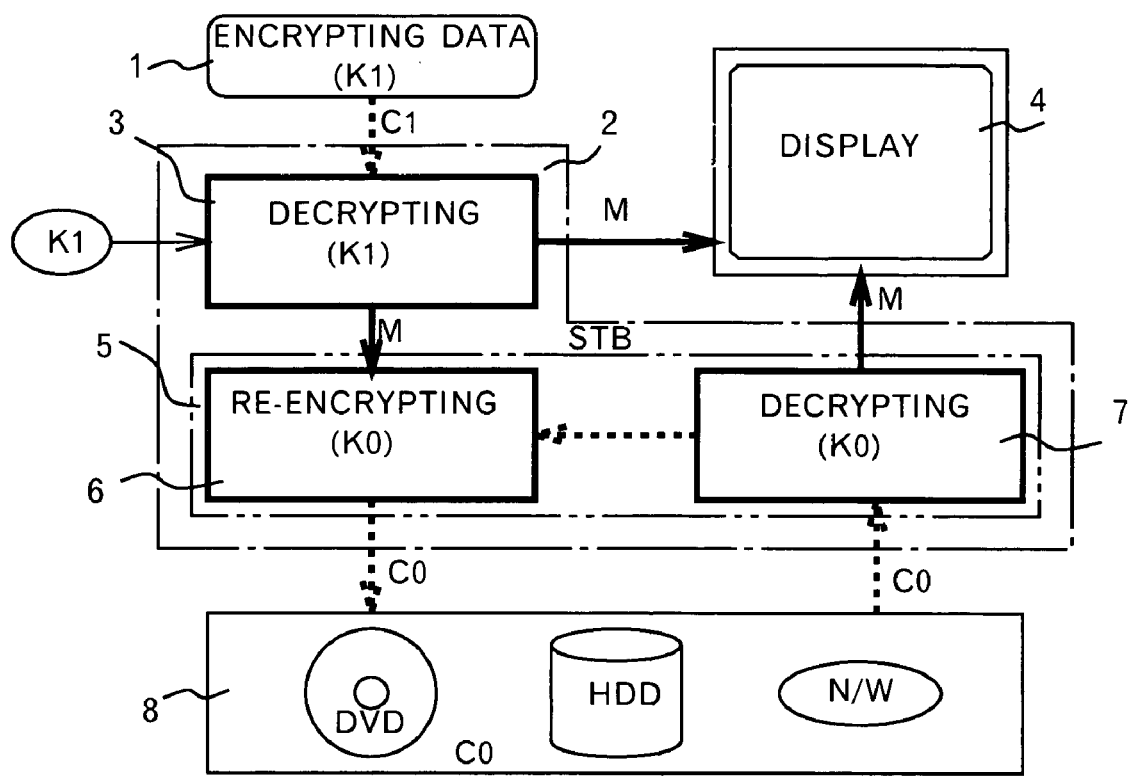
FIG. 1 shows a general arrangement of a conventional set-top box.

In the set-top box of this embodiment, as with the conventional set-top box example as shown in FIG. 1, description is not given on peripheral circuits not directly related to encryption/decryption, e.g., an amplifier unit, a compression/expansion unit and an interface unit to the outside.

The difference of the present embodiment from the conventionally proposed set-top box shown in FIG. 1 is that a changeable key encryption/decryption unit 19 for performing encryption/decryption using a second changeable key K2 is inserted between an unchangeable key encryption/decryption unit 15 performing encryption/decryption by using the unchangeable key K0 and a decryption unit 13.

In FIG. 2, reference numeral 11 represents digital data supplied by broadcasting means such as digital terrestrial wave broadcasting, digital CATV broadcasting, digital satellite broadcasting, etc., by network means such as Internet, or by digital storage medium such as a DVD, a CD, etc. The digital data is encrypted by using a first changeable key K1 to prevent illegitimate use:

$$C1 = E(M, K1)$$

and is supplied to a set-top box 12.

When the encrypted digital data C1 is supplied to the set-top box 12, the encrypted digital data C1 is decrypted by the decryption unit 13 using the first changeable key K1 obtained from a key center via the same route as or via a route different from that of the encrypted digital data C1:

$$M = D(C1, K1)$$

and the decrypted data M is outputted to a display unit 14 or the like.

In a case where the decrypted data M, for which copyrights are claimed, is stored in an external device 18, i.e., in a medium of a digital versotile disk (DVD) RAM or a hard disk, or in a case where the data is transferred externally via a network, the decrypted data M is re-encrypted using a second changeable key K2 at an encryption unit 20 of the changeable key encryption/decryption unit 19:

$$\forall 2: C2 = E(M, K2)$$
$$= E(D(C1, K1), K2),$$

further, the re-encrypted data C2 is double re-encrypted using an unchangeable key K0 by an encryption unit 16 of the unchangeable key encryption/decryption unit 15:

$$\forall 2\text{-}0: C2\text{-}0 = E(C2, K0)$$
$$= E(E(D(C1, K1), K2), K0),$$

and the double re-encrypted data C2-0 is stored in the external device 18 or transferred.

In a case where the double re-encrypted data C2-0 is used again, the re-encrypted data C2-0 read from the storage medium of the external device 18 or transferred from the network is re-decrypted by a decryption unit 17 of the unchangeable key encryption/decryption unit 15 using the unchangeable key K0:

$$\exists 2: C2 = E(C2\text{-}0, K0)$$
$$= D(E(E(D(C1, K1), K2), K0),$$

further, the re-decrypted data C2 is decrypted using the second changeable key K2 by a decryption unit 21 of the changeable key encryption/decryption unit 19:

$$\exists: M = D(C2, K2)$$
$$= D(E(D(C1, K1), K2),$$

and the decrypted data M is outputted to the display unit 14 or the like.

In this case, in order to ensure the security, it may be arranged in such a manner that, when the re-encrypted data C2-0 is read from the storage medium via a route shown by a broken line in the figure, the re-encrypted data C2-0 in the storage medium is deleted and the data re-encrypted by using the changeable key K2 and the unchangeable key K0 is re-stored.

As described above, because the re-encryption using the second changeable key K2 is performed before the re-encryption using the unchangeable key, even when the unchangeable key K0 is discovered by others, since the data is also encrypted by using the second changeable key K2, it is very difficult to cryptanalyze the encrypted data without further finding out the second changeable key K2.

Also, the second changeable key K2 is first used for re-encryption, and it is again used for re-decryption after the unchangeable key K0 is used for double re-encryption and re-decryption. Accordingly, the security of the second changeable key K2 is highly ensured, and because it is used first, it strongly governs the encrypted data in the most effective manner.

In the description of the above embodiment, the encryption unit 20 and the decryption unit 21 are contained in the changeable key encryption/decryption unit 19 and the encryption unit 16 and the decryption unit 17 are contained in the unchangeable key encryption/decryption unit 15. Of course, it goes without saying that these units 16, 17, 20 and 21 may also be separately provided.

The operations as described above can be easily implemented by providing a computer arrangement having a CPU and a system-bus in the set-top box 12.

Now, referring to FIG. 3, description will be given on another arrangement of the set-top box, which is a second embodiment of the present invention, and also, on a method for protecting the digital data carried out in this set-top box.

In this second embodiment set-top box, as with the conventional set-top box example shown in FIG. 1, description is not given on peripheral circuits not directly related to encryption/decryption, e.g., an amplifier unit and a compression/expansion unit.

The difference of the second embodiment set-top box from the first embodiment set-top box shown in FIG. 2 is that the positions are switched between the unchangeable key encryption/decryption unit 35 for encryption/decryption using the unchangeable key K0 and the changeable key encryption/decryption unit 39 for encryption/decryption using the second changeable key K2.

An unchangeable key encryption/decryption unit 35 for encryption/decryption using the unchangeable key K0 is connected to a decryption unit 33 and a display 34, and an external changeable key encryption/decryption unit 39 for encryption/decryption using the second changeable key K2 is connected to an external device 38. The second changeable key K2 may be supplied from the outside or may be generated in the set-top box.

Figure 3:
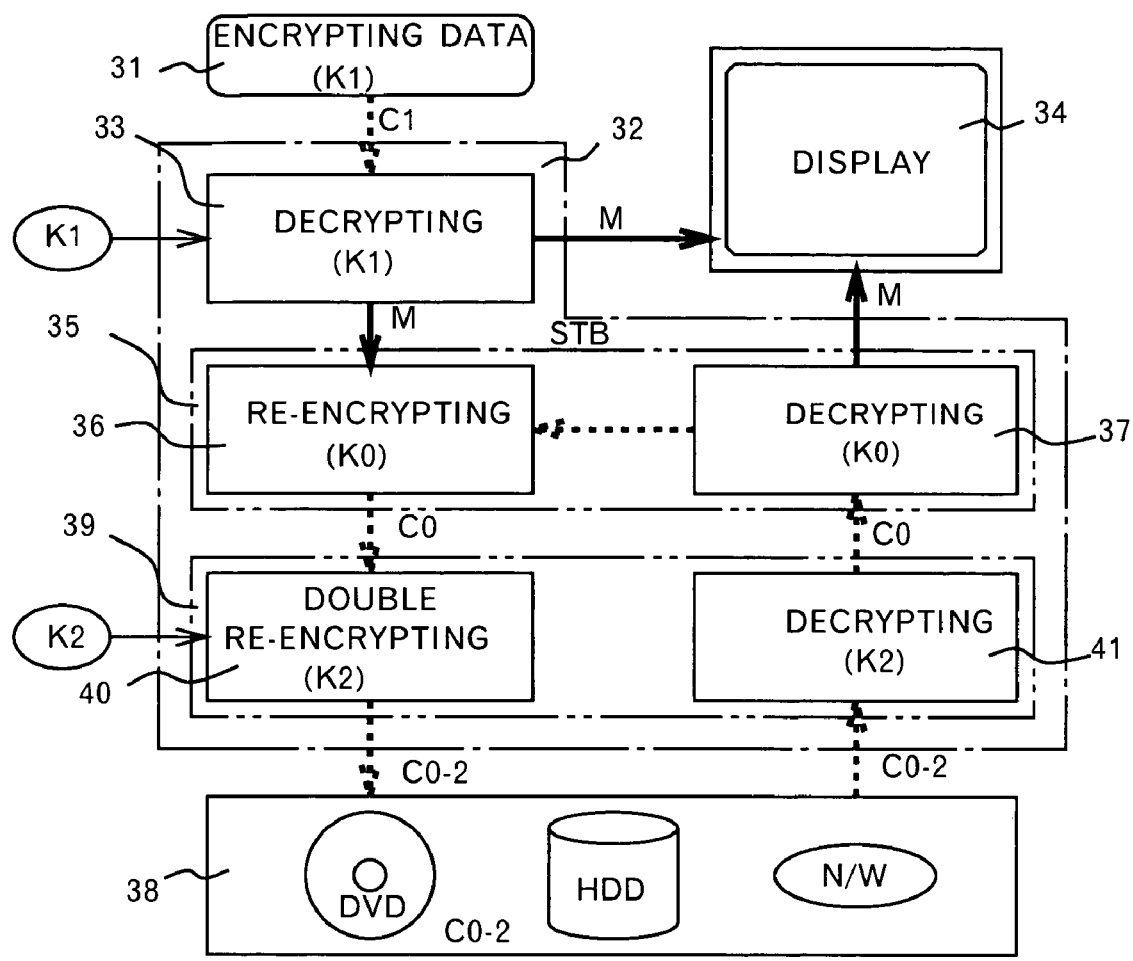
FIG. 3 shows a general arrangement of a second embodiment of the present invention applied to a set-top box.

In FIG. 3, reference numeral 31 represents digital data supplied by broadcasting means such as digital terrestrial wave broadcasting, digital CATV broadcasting, digital satellite broadcasting, etc., by network means such as Internet, or by a digital storage medium such as a DVD, a CD, etc. The data is encrypted by using a first changeable key K1 to prevent illegitimate use:

$$C1 = E(M, K1)$$

and is supplied to a set-top box 32.

When the encrypted digital data C1 is supplied to the set-top box 32, the encrypted digital data C1 is decrypted by the decryption unit 33 using the first changeable key K1 obtained via the same route as or via a route different from that of the encrypted digital data C1:

$$M = D(C1, K1)$$

and the decrypted data M is outputted to a display unit 34 or the like.

In a case where the decrypted data M, for which copyrights are claimed, is stored in an external device 38, i.e., in a medium such as a digital versatile disk (DVD) RAM or a hard disk, etc., or is transferred externally via a network, the decrypted data M is re-encrypted using the unchangeable key K0 at the encryption unit 36 of the unchangeable key encryption/decryption unit 35:

$$\forall 0: C0 = E(M, K0)$$
$$= E(D(C1, K1), K0),$$

further, the re-encrypted data C0 is double re-encrypted at an encryption unit 40 of the changeable key encryption/decryption unit 39 by using the second changeable key K2:

$$\forall 0\text{-}2: C0\text{-}2 = E(C0, K2)$$
$$= E(E(D(C1, K1), K0), K2),$$

and double re-encrypted data C0-2 is stored in the external device 38 or transferred.

In a case where the double re-encrypted data C0-2 is used again, the re-encrypted data C0-2 read from the storage medium of the external device 38 or transferred from the network is re-decrypted using the external changeable key K2 by the re-decryption unit 41 of the external changeable key encryption/decryption unit 39:

$$\exists : 0 : C0 = [E]D(C0-2, K2)$$
$$= D(E(E(D(C1, K1), K0), K2),$$

further, the re-decrypted data C0 is again re-decrypted using the unchangeable key K0 by a decryption unit 37 of the unchangeable key encryption/decryption unit 35:

$$\exists : M = D(C0, K0)$$
$$= D(E(D(C1, K1), K0)$$

and the decrypted data M is outputted to the display unit 34 or the like.

In this case, in order to ensure the security, it may be arranged in such a manner that, when the re-encrypted data C2-0 is read from the storage medium via a route shown by a broken line in the figure, the double re-encrypted data C0-2 in the storage medium is erased and the data re-encrypted by using the unchangeable key K0 and the external changeable key K2 is re-stored.

As described above, because the re-encryption is performed using the unchangeable key K0 before the re-encryption using the second changeable key K2, even when the unchangeable key K0 is discovered by others, since the data is also encrypted by using the second changeable key K2, it is very difficult to cryptanalyze the encrypted data without further finding out the second changeable key K2.

In this arrangement, the changeable key encryption/decryption unit 39 is simply added to the unchangeable key encryption/decryption unit 35 of the conventionally proposed set-top box shown in FIG. 1, and accordingly, a set-top box employing the present invention can be easily achieved.

In the description of this embodiment, the encryption unit 36 and the decryption unit 37 are contained in the unchangeable key encryption/decryption unit 35 and the encryption unit 40 and the decryption unit 41 are contained in the changeable key encryption/decryption unit 39. Of course, it goes without saying that these units 36, 37, 40 and 41 may also be separately provided.

The operation as described above can be easily implemented by providing a computer arrangement having a CPU and a system-bus in the set-top box 32.

Digital data content is handled not only in the set-top box but also in a computer such as a personal computer.

Referring to FIG. 4 through FIG. 7, description will be given on embodiments of the present invention applied to an apparatus using a personal computer.

Unlike the set-top box where all components are constituted of hardware and are operated only by the hardware, a personal computer is an apparatus, which is operated by controlling the hardware incorporated in the apparatus using software.

In order to efficiently operate the computer, an operating system (OS) is used, which manages the overall operation of the computer.

A conventional operating system used in the personal computer comprises a kernel for providing basic services such as memory management, task management, interrupt handling and communication between processes, and an operating system service providing other services.

However, with the advances in computer developments, for example, the functional improvements of a microprocessor and the price decrease of RAM used as main memory, and also the user's demand for an increase of the performance ability of computers, improvements in the functions of the operation system to manage the overall computer operation has been required. Accordingly, the scale of the operating system has become comparatively larger than before.

Since such an enlarged operating system itself occupies a large amount of space in the hard disk where it is to be stored, the space to store application programs or data needed by the user is liable to be rather limited, and that may lead to inconvenience for the user in using the computer.

To cope with such situations, newer operating systems are often designed with user-dependent subsystem parts (such as an environmental subsystem for performing emulation of the other operating systems and graphics, and a core subsystem such as a security subsystem) removed from a kernel. Basic parts of an operating system consist of a HAL (hardware abstraction layer) to absorb differences of hardware, micro-kernels to provide a scheduling function, an interrupt function, an I/O management function, etc., and a system service API (application programming interface) interposed between the subsystem and the micro-kernel.

With the above arrangement, expandability of the operating system needing changes or additions of function is improved, and portability of the operating system corresponding to the intended purpose can be made much easier.

By the distributed arrangement of elements of the micro-kernel to a plurality of network computers, it is now possible to easily realize a distributed operating system.

Computers are used in computer peripheral units, various types of control units, communication devices, etc., in addition to personal computers typically represented by the desk-top type or notebook type personal computers. In such cases, unlike the operating system for a general-purpose personal computer, in which importance is put on the man-machine interface, a real-time operating system is adopted, in which importance is placed on speedy execution. An operating system, especially one for embedding, is suitable for each of these units and devices.

Of course, the cost for development is increased when developing an operating system specially tailored for different embedded devices. For this reason, it is recently proposed to use a general-purpose operating system in the personal computer also for the embedded type real-time operating system. By arranging a program specific for the embedded type in a subsystem combined with a micro-kernel, it is now practical to obtain an embedded type real-time operating system.

Major functions of the operating system include task management such as scheduling or interrupt processing.

The task management has mainly two different types in the operating system: single task type, which only performs one task processing at the same time, and multi-task type for performing a plurality of task processings at the same time. The multi-task type is divided into a multi-task type where changeover of the task depends upon the task to be processed, and a multi-task type not dependent upon the task to be processed.

Among these, the single task type allocates one process to an MPU so that the MPU is not free until the process is completed. A non-preemptive multi-task type allows the MPU to be allocated a plurality of processes by time division, so that process is not executed unless the process in execution gives the control back to the operating system. A preemptive multi-task type interrupts the process in execution at a certain time interval, so that the control is forcibly transferred to the other process.

Therefore, real-time multi-tasking can be achieved only by the preemptive type.

The task management in the computer is carried out according to the process, which is a unit having system resources such as a memory, a file, etc., and the process is managed according to a thread, which is a unit to allocate CPU time with divided processes. In this case, the system resources are shared by all threads in the same process. This means that there are more than one thread to share system resources in one process.

Each task to be processed by the multi-task type has a priority spectrum, which is generally divided into 32 steps. The normal task performing no interrupt is classified into dynamic classes, which are divided into 0–15 steps, and the task performing interrupt is classified to real-time classes to be divided into 16–31 steps.

Interrupt processing is executed using an interrupt enable time (normally 10 milliseconds) called a "time slice" unit. Ordinary interrupt is executed at 10-millisecond time slices.

Under such circumstances, a time slice has been recently proposed, in which an interrupt enable time called a "real-time slice" is 100 microseconds. If this real-time slice is used, it is possible to execute an interrupt with priority over the conventional interrupt of 10 milliseconds.

Figure 4:
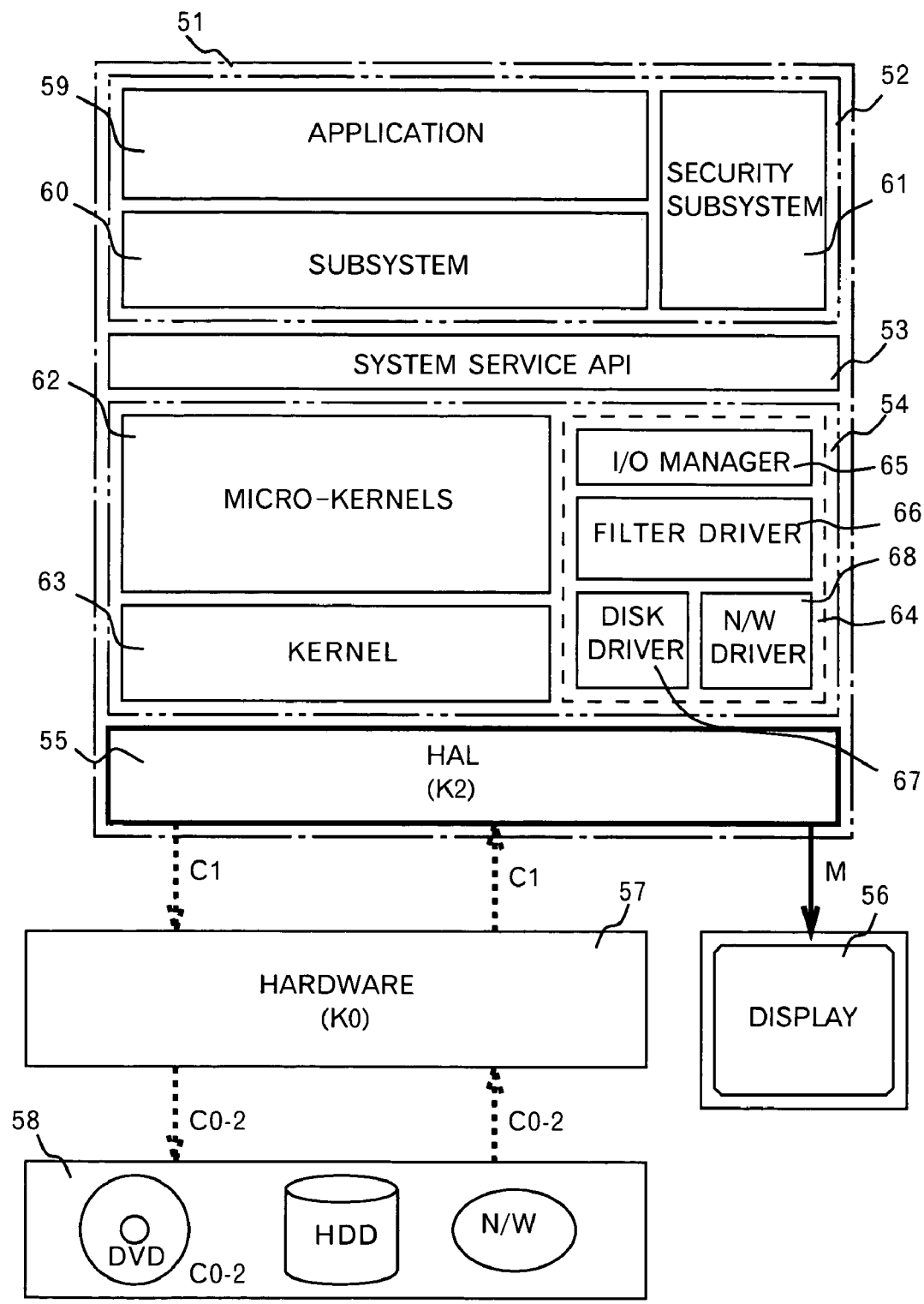
FIG. 4 shows a general arrangement of a third embodiment applied to an apparatus using a personal computer.

In a third embodiment shown in FIG. 4, changeable key encryption/decryption processing by software and the management of a crypt key in the computer are carried out by a real-time OS provided in the HAL.

In FIG. 4, reference numeral 51 represents an operating system in a computer; 56 a display unit for displaying output from the computer; 57 an unchangeable key encryption/decryption unit; and 58 a data storage medium such as a digital versatile disk (DVD) RAM or a hard disk, or a data transfer system such as a network.

The operating system 51 comprises an operating system service 52 and a system service API 53, which are user regions, and a kernel 54 and a HAL 55, which are non-user regions. The system service API 53 is arranged between the operating system service 52 and the kernel 54 and serves to mediate between the operating system service 52 and the kernel 54. The HAL 55 is arranged at the lowermost layer of the operating system 51 and serves to absorb differences in the hardware for the software.

The operating system service 52 comprises an application 59, a subsystem 60 and a security subsystem 61. The kernel 54 comprises a plurality of micro-kernels 62 and 64 and a kernel 63. The micro-kernel 62 has task management functions such as scheduling, interrupt, etc., and the micro-kernel 64 has an I/O management function.

The micro-kernel 64 having the I/O management function comprises an I/O manager 65, device drivers such as a disk driver 67 and a network driver 68, which are managed by the I/O manager, and a filter driver 66 which is inserted when necessary between the I/O manager 65 and the device drivers such as the disk driver 67 and the network driver 68.

The changeable key encryption/decryption processing in the computer is executed by software. In case of the third embodiment, the changeable key encryption/decryption processing is carried out by the aforementioned real-time OS (RTOS) with priority over other tasks in the HAL 55 in the operating system 51.

Similar to the first embodiment shown in FIG. 2, digital data supplied by broadcasting means such as digital terrestrial wave broadcasting, digital CATV broadcasting, digital satellite broadcasting, etc., by network means such as Internet, or by a digital storage medium such as a DVD, a CD, etc., is encrypted using a first changeable key K1 to prevent illegitimate use:

$$C1 = E(M, K1)$$

and is supplied. The supplied encrypted digital data C1 is decrypted by the operating system service 52 using the first changeable key K1 provided from the key center via the same route as or via a route different from that of the encrypted digital data C1:

$$M = D(C1, K1)$$

and the decrypted data M is outputted to the display unit 56 or the like.

In a case where the decrypted data M, for which copyrights are claimed, is stored in a medium such as a digital versatile disk (DVD) RAM or a hard disk, or where it is transferred externally via a network, the decrypted data M is mandatorily re-encrypted by HAL 55 using a second changeable key K2:

$$\forall 2 : C2 = E(M, K2)$$
$$= E(D(C1, K1), K2).$$

Further, the re-encrypted data C2 is double re-encrypted at the unchangeable key encryption/decryption unit 57 by using an unchangeable key K0:

$$\forall 2\text{-}0 : C2\text{-}0 = E(C2, K0)$$
$$= E(E(D(C1, K1), K2), K0),$$

and the double re-encrypted data C2-0 is stored in an external device or transferred. The changeable key K2 may be provided from the outside or may be generated in a set-top box.

When the double re-encrypted data C2-0 is utilized, the double re-encrypted data C2-0 read from the storage medium or transferred via the network is re-decrypted using the unchangeable key K0 at the unchangeable key encryption/decryption unit 57:

$$\exists 2 : C2 = [E]\underline{D}(C2 - 0, K0)$$
$$= D(E(E(D(C1, K1), K2), K0).$$

Further, the re-decrypted data C2 is decrypted using the second changeable key K2 by the HAL 55 having the changeable key encryption/decryption function:

$$\exists : M = D(C2, K2)$$
$$= D(E(D(C1, K1), K2),$$

and the decrypted data M thus obtained is outputted to the display unit 56 or the like.

The real-time OS is executed in priority over every other task. In the third embodiment, the real-time OS is implemented by the HAL, being a contact point with the hardware in the operating system. Accordingly, the re-encryption of the digital data is performed in a reliable manner, and it is impossible for decrypted data M, as it is, to be stored into the external device or to be transferred. Also, re-encryption is performed using the second changeable key K2 before the re-encryption using the unchangeable key K0. As a result, even if the unchangeable key K0 is known, it is very difficult to cryptanalyze the encrypted data by finding out the second changeable key K2, as the data is also encrypted by the second changeable key K2.

Because the second changeable key K2 is used first and is then used after the unchangeable key K0 has been used, key security can be ensured. Because the second changeable key K2 is used first, it strongly governs the encrypted data.

The above operations can be easily implemented by arranging the unchangeable key encryption/decryption unit 57 as a sub-computer structure having a CPU and a system-bus.

Figure 5:
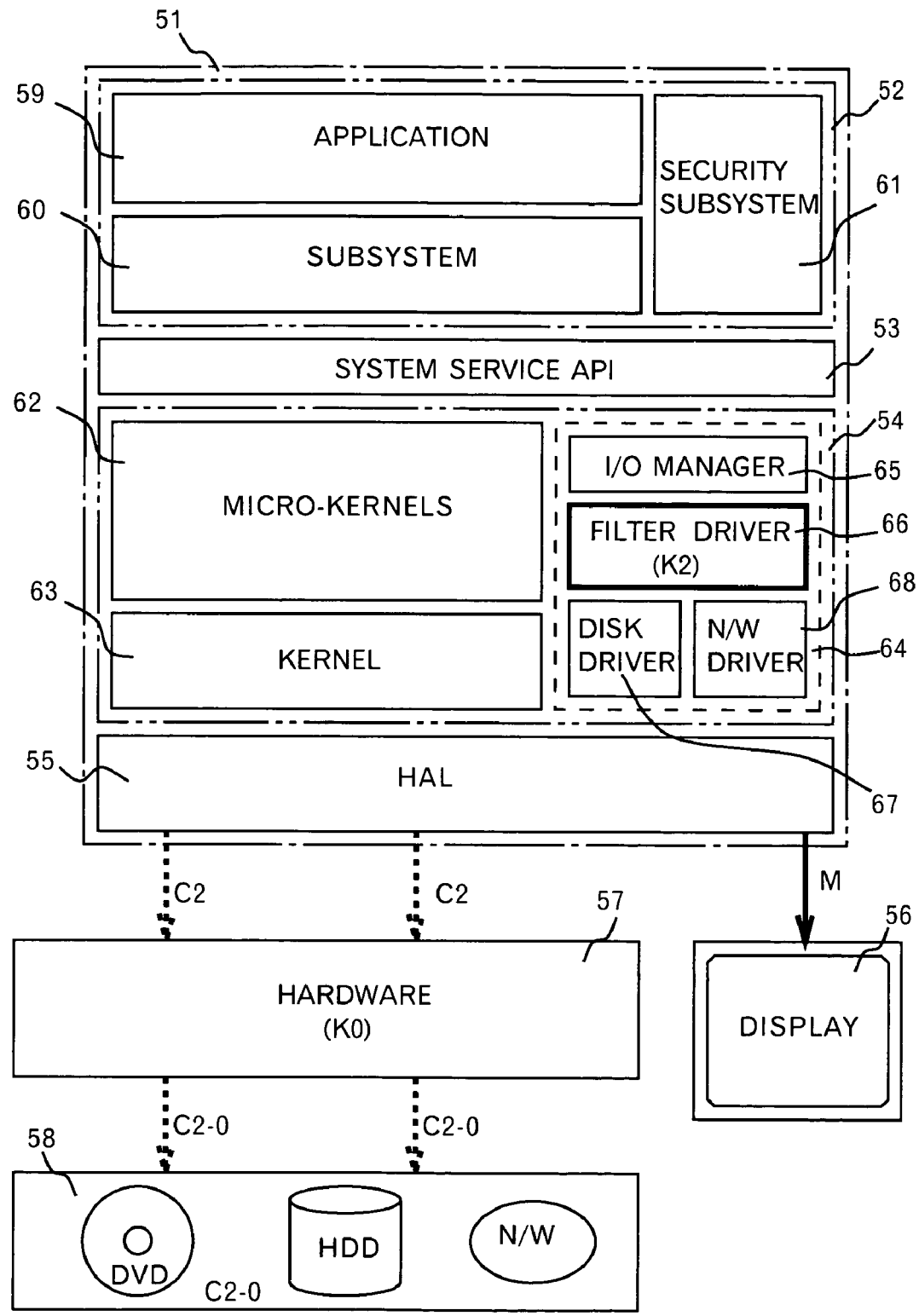
FIG. 5 shows a general arrangement of a fourth embodiment applied to an apparatus using a personal computer.

In a fourth embodiment shown in FIG. 5, the changeable key encryption/decryption is provided by software carried out at a filter driver 66 placed in the I/O management micro-kernel 64 in the kernel 54.

Figure 6:
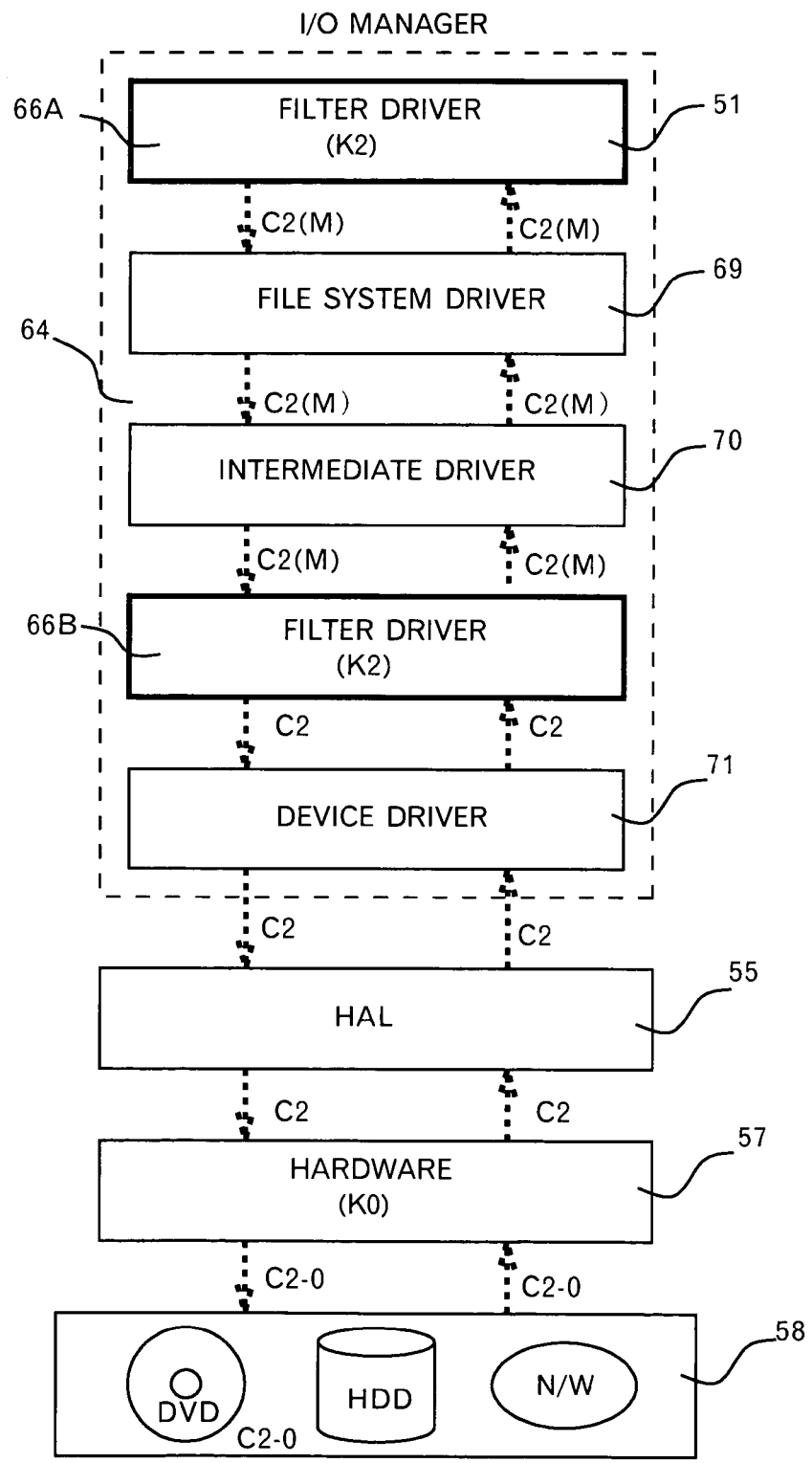
FIG. 6 is a drawing to give detailed explanation for the fourth embodiment.

FIG. 6 shows an arrangement of the I/O management micro-kernel 64 with the filter driver 66 placed in it.

In an I/O management micro-kernel with no filter driver placed in it, a file system driver 69, an intermediate driver 70 and a device driver 71 are arranged from an upper hierarchy to a lower hierarchy. When necessary, a filter driver 66A or a filter driver 66B is placed above the file system driver 69 or between the intermediate driver 70 and the device driver 71.

Because the I/O management micro-kernel can be designed to have these filter drivers 66A and 66B perform re-encryption/re-decryption and management of the key, the filter drivers 66A or 66B is designed to carry out the re-encryption/re-decryption processing and the key management in this embodiment.

The filter driver is arranged, not in the operating system service unit 52 which can be handled by the user, but in the kernel 54 which cannot be handled by the user. On the other hand, it is generally practiced to make the specification change to fit the particular computer using the operating system. In particular, it is not very rare to change the I/O manager therein.

Utilizing the above, the modules having the function of re-encryption/re-decryption processing and the key management are placed in the I/O manager as the filter driver 66A or the filter driver 66B in the fourth embodiment.

Similar to the first embodiment shown in FIG. 2, digital data supplied by broadcasting means such as digital terrestrial wave broadcasting, digital CATV broadcasting, digital satellite broadcasting, etc., by network means such as Internet, or by digital storage medium such as a DVD, a CD, etc. is encrypted using a first changeable key K1 to prevent illegitimate use:

$$C1 = E(M,K1)$$

and it is supplied. The encrypted and supplied digital data C1 is decrypted by the operating system service unit 52 using the first changeable key K1 provided from the key center via the same route as or via a route different from that of the encrypted digital data C1:

$$M = D(C1,K1)$$

and the decrypted data M is outputted to the display unit 56 and the like.

In a case where the decrypted data M, for which copyrights are claimed, is stored in a medium such as a digital versatile disk (DVD) RAM or a hard disk, or in a case where it is transferred externally via a network, the decrypted data M is mandatorily re-encrypted by the filter driver 66A or 66B using the external changeable key K2:

$$\forall 2 : C2 = E(M,K2) = E(D(C1,K1),K2).$$

Further, the re-encrypted data C2 is double re-encrypted at the internal unchangeable key encryption/decryption unit 57, using an unchangeable key K0:

$$\forall 2\text{-}0 : C2\text{-}0 = E(C2, K0)$$
$$= E(E(D(C1, K1), K2), K0),$$

and double re-encrypted data C2-0 is stored into the external device or transferred. The changeable key K2 may be provided from the outside or may be generated in a set-top box.

When the double re-encrypted data C2-0 is utilized again, the double re-encrypted data C2-0 read from the storage medium or transferred via the network is re-decrypted using the unchangeable key K0 at the internal unchangeable key encryption/decryption unit 57:

$$\exists 2 : C2 = D(C2\text{-}0, K0)$$
$$= D(E(E(D(C1, K1), K2), K0).$$

Further, the re-decrypted data C2 is decrypted by the filter driver 66A or 66B, using the second changeable key K2:

$$\exists : M = D(C2, K2)$$
$$= D(E(D(C1, K1), K2)$$

and the decrypted data M thus obtained is outputted to the display unit 56 or the like.

The filter driver can be easily placed into the kernel of the operation system in a part of the I/O manager. In so doing, the function of the re-encryption/re-decryption processing and the key management can be easily incorporated into the operation system. Also, since re-encryption is performed using the second changeable key K2 before the re-encryption using the unchangeable key K0, even if the unchangeable key K0 is discovered by others, it is very difficult to cryptanalyze the encrypted data without finding out the second changeable key K2 because the data is also encrypted by the second changeable key K2.

Further, because the second changeable key K2 is used first, and is then, used after the unchangeable key K0 is used, the key security can be highly ensured. Also, because the second changeable key K2 is used first, it strongly governs the encrypted data.

The above operations can be easily implemented by arranging the unchangeable key encryption/decryption unit 57 as a sub-computer structure having a CPU and a system-bus.

Figure 7:
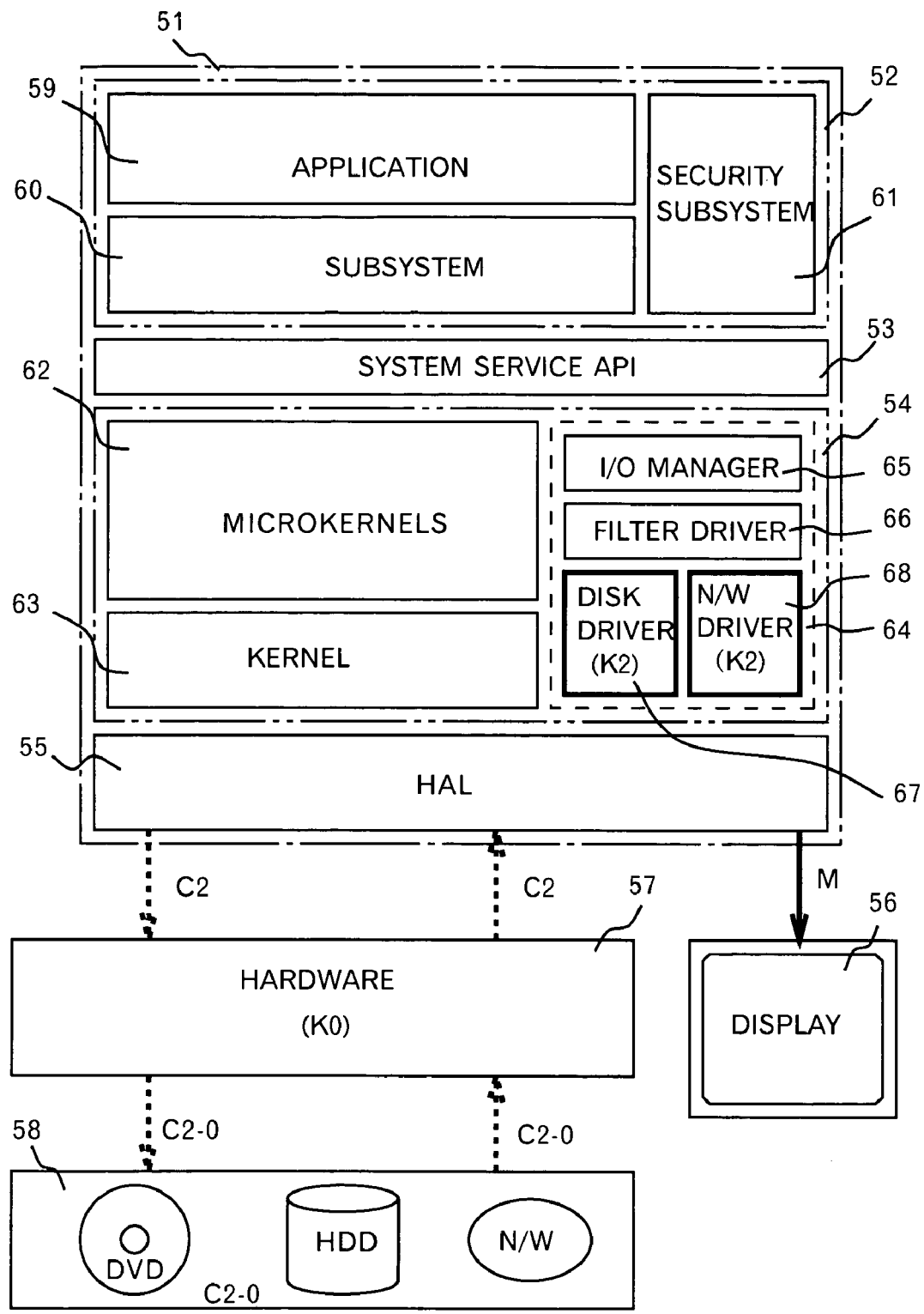
FIG. 7 shows a general arrangement of a fifth embodiment applied to an apparatus using a personal computer.

In a fifth embodiment shown in FIG. 7, the changeable key encryption/decryption and the key management is provided by software carried out at the disk driver 67 and the network driver 68 contained in the I/O management micro-kernel 64 in the operating system 51.

As already explained in connection with FIG. 6, the file system driver 69, the intermediate driver 70, and the device driver 71 are arranged from an upper hierarchy to a lower hierarchy in the I/O management micro-kernel. The changeable key encryption/decryption processing and the key management can be carried out also in the device driver 71 positioned at the lowermost layer.

Similar to the first embodiment shown in FIG. 2, the digital data supplied by broadcasting means such as digital terrestrial wave broadcasting, digital CATV broadcasting, digital satellite broadcasting, etc., by network means such as Internet, or by digital storage medium such as a DVD, a CD, etc., is encrypted using the first changeable key K1 to prevent illegitimate use:

$$C1 = E(M,K1)$$

and it is supplied. The encrypted and supplied digital data C1 is decrypted by the operating system service unit 52 using the first changeable key K1 provided from the key center via the same route as or a route different from that of the encrypted digital data C1:

$$M = D(C1,K1)$$

and the decrypted data M is outputted to the display unit 56 or the like.

In a case where the decrypted data M, for which copyrights are claimed, is stored in a medium such as a digital versatile disk (DVD) RAM or a hard disk, or in a case where it is transferred externally via a network, the decrypted data M is mandatorily re-encrypted by the device driver 71, i.e., the disk driver 67 and the network driver 68, using the second changeable key K2:

$$\forall 2 : C2 = E(M, K2)$$
$$= E(D(C1, K1), K2).$$

Further, the re-encrypted data C2 is double re-encrypted at the unchangeable key encryption/decryption unit 57 using the unchangeable key K0 placed in the unchangeable key encryption/decryption unit 57:

$$\forall 2\text{-}0 : C2\text{-}0 = E(C2, K0)$$
$$= E(E(D(C1, K1), K2), K0),$$

and double re-encrypted data C2-0 is stored in the external device or transferred. The changeable key K2 may be provided from the outside or may be generated in a set-top box.

When the double re-encrypted data C2-0 is utilized again, the double re-encrypted data C2-0 read from the storage medium or transferred via a network is re-decrypted using the unchangeable key K0 by the internal unchangeable key encryption/decryption unit 57:

$$\exists 2 : C2 = D(C2 - 0, K0)$$
$$= D(E(E(D(C1, K1), K2), K0).$$

Further, the re-decrypted data C2 is decrypted by the device driver 71, i.e., the disk driver 67 and the network driver 68, using the second changeable key K2:

$$\exists : M = D(C2, K2)$$
$$= D(E(D(C1, K1), K2)$$

and the decrypted data M thus obtained is outputted to the display unit 56 or the like.

Since the function of the re-encryption/re-decryption processing and the key management is incorporated into such a device driver, it allows the easy incorporation of the function into the kernel of the operating system. Also, since re-encryption is performed using the second changeable key K2 before the re-encryption using the unchangeable key K0, even if the unchangeable key K0 is discovered by others, it is very difficult to cryptanalyze the encrypted data without finding out the second changeable key K2 because the data is also encrypted using the second changeable key K2.

There is a possibility that the second changeable key K2 may be discovered by others, when it is repeatedly used. In such a case, it is preferably designed in such a manner that the second changeable key K2 used for encryption is abandoned and generated again when necessary for decryption, as described in Japanese Patent Laid-Open Publication 185448/1996 (EP0704885A2, U.S. Ser. No. 08/536,749). If it is necessary to have the key for decryption, it should be obtained from the key center again.

For security purposes, K1, K2 and K0 may be based on different crypt algorithms.

These operations can be easily implemented by arranging the unchangeable key encryption/decryption unit 57 as a sub-computer structure having a CPU and a system-bus.

In the embodiments described above, the second changeable key K2 and the unchangeable key K0 are used in addition to the first changeable key K1. In the embodiments described below, a third changeable key K3 is used additionally so that more reliable copyright management of digital content is provided.

Figure 8:
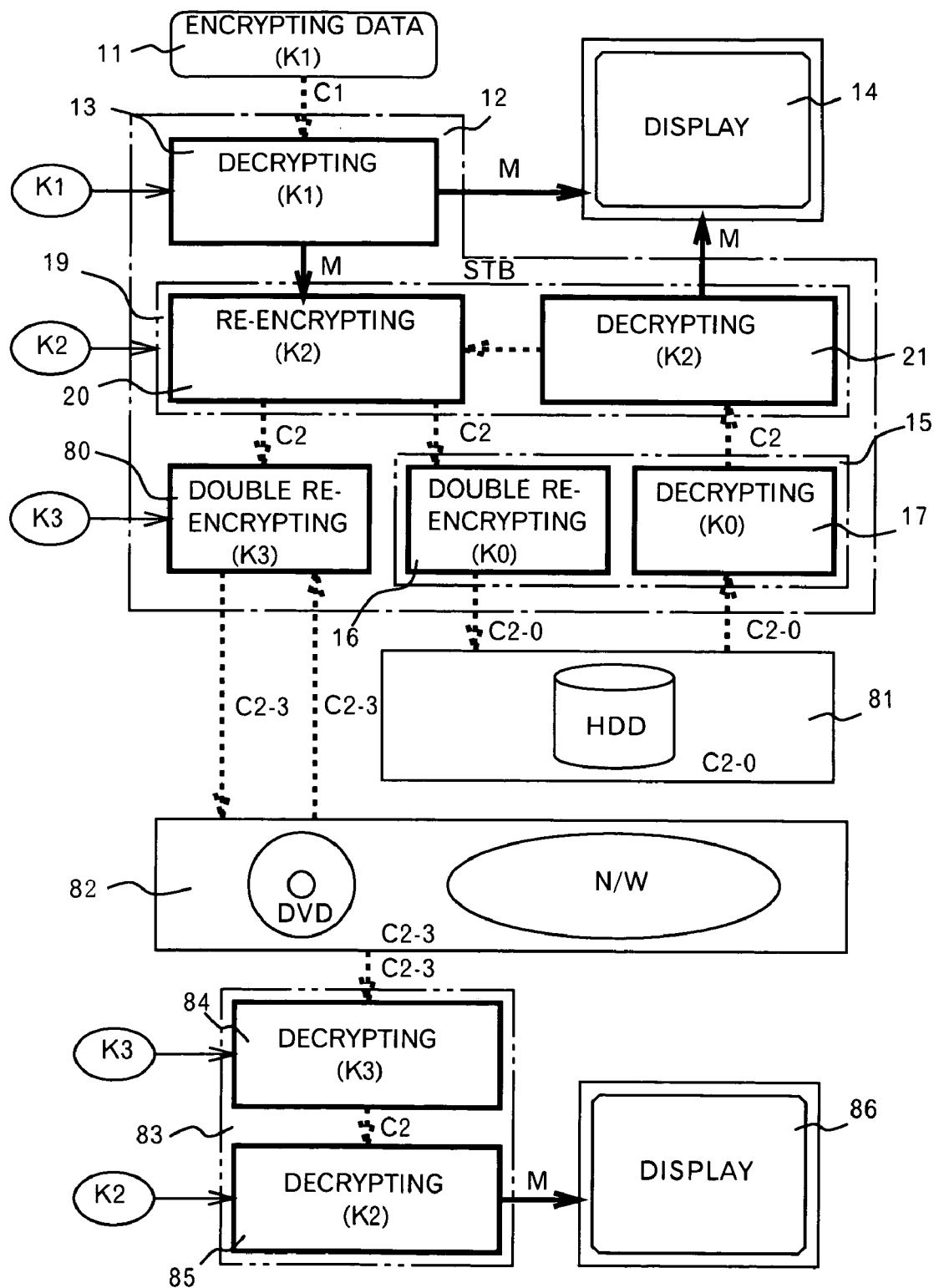
FIG. 8 shows a general arrangement of a sixth embodiment set-top box, which is a variation of the first embodiment.

Referring to FIG. 8, description will be given on an arrangement of a set-top box in a sixth embodiment of the present invention, which is a variation of the first embodiment, and also on a method for protecting digital data carried out in the set-top box.

In the set-top box of this embodiment, similar to the set-top box of the first embodiment, no description is given on peripheral circuits not directly related to encryption/decryption, e.g., an amplifier unit and a compression/decompression unit.

The set-top box of the sixth embodiment has a difference from that of the first embodiment in distinguishing between a case where the decrypted data M is stored in a storage medium 81 such as a hard disk, which is incorporated in or dedicated to the set-top box, and another case where the decrypted data M is stored in a removable medium, e.g., a DVD-RAM, in an external 82 or is transferred externally via a network.

The internal unchangeable key encryption/decryption unit 15 and further a changeable key encryption unit 80 are provided. In a case where the decrypted copyrighted data is stored, for example, in a hard disk as a storage medium 81, which is incorporated in or dedicated to the set-top box, it is double re-encrypted using an internal unchangeable key K0. On the other hand, in a case where it is stored in a removable medium, i.e., a DVD-RAM, or is transferred externally via the network, it is double re-encrypted, not by the internal unchangeable key K0 but by a third changeable key K3.

In FIG. 8, reference numeral 11 represents digital data, which is supplied by broadcasting means such as digital terrestrial wave broadcasting, digital CATV broadcasting, digital satellite broadcasting, etc., by network means such as Internet, or by a digital storage medium such as a DVD, a CD, etc. The digital data is encrypted using a first changeable key K1 to prevent illegitimate use:

$$C1 = E(M, K1)$$

and encrypted digital data C1 is supplied to a set-top box 12.

When the encrypted digital data C1 is supplied to the set-top box 12, the encrypted digital data C1 is decrypted by a decryption unit 13 using a first changeable key K1 obtained from a key center:

$$M = D(C1, K1)$$

and the decrypted data M is outputted to a display unit 14 or the like.

In a case where the decrypted copyrighted data M is stored in a storage medium 81 such as a hard disk, which is incorporated in or is dedicated to the set-top box 12, or in a removable medium such as a DVD-RAM, or where it is transferred externally via a network, the decrypted data M is re-encrypted by an encryption unit 20 of a changeable key encryption/decryption unit 19 using a second changeable key K2, which is obtained from the key center or generated in the set-top box 12:

$$\forall 2: C2 = E(M, K2)$$
$$= E(D(C1, K1), K2).$$

In a case where the re-encrypted data C2 is stored in a hard disk of the storage medium 81 incorporated into or dedicated to the set-top box 12, the re-encrypted data C2 is double re-encrypted by an encryption unit 16 of an internal unchangeable key encryption/decryption unit 15 using an unchangeable crypt key K0 placed in the internal unchangeable key encryption/decryption unit 15:

$$\forall 2\text{-}0: C2\text{-}0 = E(C2, K0)$$
$$= E(E(D(C1, K1), K2), K0)$$

and the double re-encrypted data C2-0 is stored in the storage medium 81 or the like.

When the re-encrypted data C2-0 stored in the storage medium 81 is utilized, the double re-encrypted data C2-0 read from the storage medium 81 is decrypted using the unchangeable crypt key K0 placed in a decryption unit 17 of the internal unchangeable key encryption/decryption unit 15:

$$\exists 2: C2 = D(C2-0, K0)$$
$$= D(E(E(D(C1, K1), K2), K0)$$
$$= E(E(D(C1, K1), K2),$$

further, the re-decrypted data C2 is decrypted using the changeable key K2 by a decryption unit 21 of the changeable key encryption/decryption unit 19:

$$\exists : M = D(C2, K2)$$
$$= D(E(D(C1, K1), K2)$$

and the decrypted data M is outputted to the display unit 14 or the like.

In this case, in order to ensure security, when the double re-encrypted data C2-0 is read from the storage medium 81 via a path shown by a broken line in the figure, it may be designed in a manner that the double re-encrypted data C2-0 in the storage medium 81 is erased at that time, and that the data re-encrypted using the changeable key K2 and the internal unchangeable key K0 is stored again.

In a case where the re-encrypted data C2 is stored in a DVD-RAM of a removable medium, or it is transferred externally via a network at the externals 82, the re-encrypted data C2 is double re-encrypted using a third changeable key K3, which is obtained from the key center or generated in the set-top box 12, by a changeable key encryption unit 80:

$$\forall 2\text{-}3: C2\text{-}3 = E(C2, K3)$$
$$= E(E(M, K2), K3).$$

When the double re-encrypted data C2-3 sent to the externals 82 is utilized, the double re-encrypted data C2-3 is decrypted using the third changeable key K3 stored at a decryption unit 84 of a changeable key encryption/decryption unit 83:

$$\exists 2: C2 = D(C2-3, K3)$$
$$= D(E(E(M, K2), K3), K3)$$
$$= E(M, K2),$$

further, the re-encrypted data C2 thus obtained is decrypted using the second changeable key K2 by a decryption unit 85 of the changeable key encryption/decryption unit 83:

$$\exists : M = D(C2, K2)$$
$$= D(E(M, K2), K2)$$

and the decrypted data M thus obtained is outputted to a display unit 86 or the like.

These operations can be easily achieved by providing a sub-computer arrangement having a CPU and a system-bus in the set-top box 12.

Figure 9:
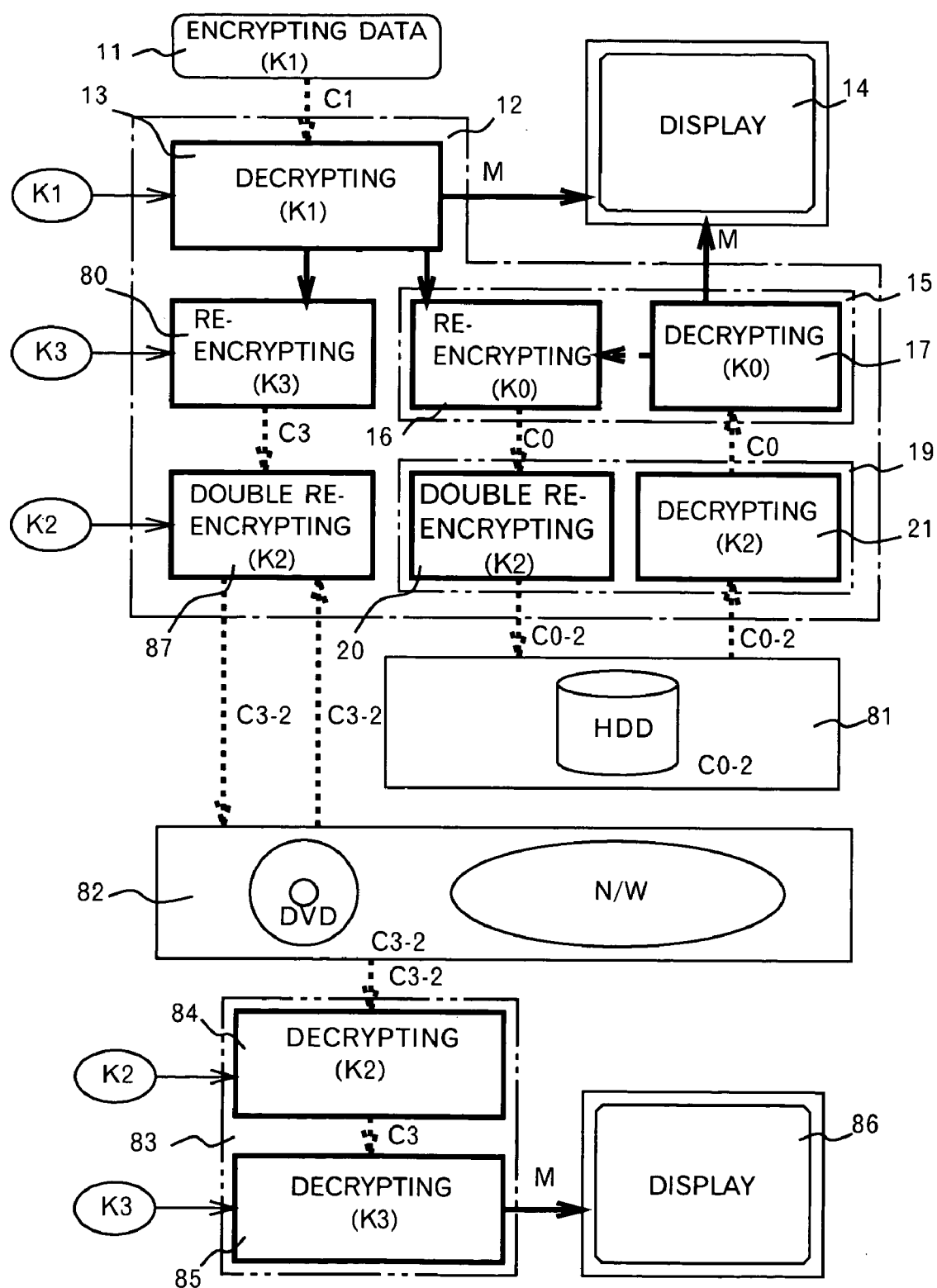
FIG. 9 shows a general arrangement of a seventh embodiment set-top, which is a variation of the sixth embodiment.

Referring to FIG. 9, description will be given on an arrangement of a set-top box of a seventh embodiment, which is a variation of the sixth embodiment, and also on a method for protecting digital data carried out in the set-top box.

In the set-top box of this embodiment again, similar to the set-top box of the sixth embodiment, no description is given on peripheral circuits not directly related to encryption/decryption, e.g., an amplifier unit and a compression/decompression unit.

The seventh embodiment set-top box is different from that of the sixth embodiment in that the inserted positions are exchanged between the unchangeable key encryption/decryption unit 15 for performing encryption/decryption using the unchangeable key K0 and the changeable key encryption/decryption unit 19 for performing encryption/decryption using the second changeable key K2, and in that there is further provided a changeable key encryption unit 87 for performing encryption/decryption using the second changeable key K2 for the case where the data is stored in a DVD-RAM of a removable medium or is transferred externally via a network at the externals 82.

The digital data 11, which is supplied by broadcasting means such as digital terrestrial wave broadcasting, digital CATV broadcasting, digital satellite broadcasting, etc., by network means such as Internet, or by a digital storage medium such as a DVD, a CD, etc., is encrypted using a first changeable key K1 in order to prevent illegitimate use:

$$C1 = E(M, K1)$$

and encrypted digital data C1 is supplied to the set-top box 12.

When the encrypted digital data C1 is supplied to the set-top box 12, the encrypted digital data C1 is decrypted by the decryption unit 13 using the first changeable key K1 obtained from the key center:

$$M = D(C1, K1)$$

and the decrypted data M thus obtained is outputted to the display unit 14 or the like.

In a case where the copyrighted and decrypted data M is stored in the storage medium 81 such as a hard disk incorporated in or dedicated to the set-top box 12, the decrypted data M is re-encrypted to re-encrypted data C0 using the unchangeable crypt key K0 by the internal unchangeable key encryption/decryption unit 15:

$$\forall 0: C0 = E(M, K0)$$
$$= E(D(C1, K1), K0).$$

The re-encrypted data C0 is double re-encrypted by the encryption unit 20 of the changeable key encryption/decryption unit 19 using the second changeable key K2 obtained from the key center or generated in the set-top box 12:

$$\forall 0\text{-}2: C0\text{-}2 = E(C0, K2)$$
$$= E(E(M, K0), K2)$$

and the double re-encrypted data C0-2 is stored in the storage medium 81 or the like.

When the double re-encrypted data C0-2 stored in the storage medium 81 is utilized, the double re-encrypted data C0-2 read from the storage medium 81 is re-decrypted by the decryption unit 21 of the changeable key encryption/decryption unit 19 using the second changeable key K2:

$$\exists 0: C0 = D(C0\text{-}2, K2)$$
$$= D(E(C0, K2), K2),$$

further, the re-decrypted data C0 is re-decrypted again using the unchangeable key K0 at the decryption unit 17 of the unchangeable key encryption/decryption unit 15:

$$\exists : M = D(C0, K0)$$
$$= D(E(M, K0), K0)$$

and the decrypted data M thus obtained is outputted to the display unit 14 or the like.

In this case, in order to ensure security, when the double re-encrypted data C0-2 is read from the storage medium 81 via a route shown by a broken line in the figure, it may be designed in a manner that the double re-encrypted data C0-2 in the storage medium 81 is erased at that time, and that the data re-encrypted using the second changeable key K2 and the unchangeable key K0 is stored again.

In a case where the decrypted data M is stored in a DVD-RAM of a removable medium or is transferred outside via a network at the externals 82, the decrypted data M is re-encrypted to re-encrypted data C3 using a third changeable key K3 obtained from the key center or generated in the set-top box 12 by the changeable key encryption unit 80:

$$\forall 3: C3 = E(M, K3)$$
$$= E(D(C1, K1), K3).$$

The re-encrypted data C3 is encrypted to double re-encrypted data C3-2 by the changeable key encryption unit 87 using the second changeable key K2 obtained from the key center or generated at the set-top box 12:

$$\forall 3\text{-}2: C3\text{-}2 = E(C3, K2)$$
$$= E(E(D(C1, K1), K3), K2)$$

and the double re-encrypted data C3-2 is stored in the DVD-RAM or is transferred via a network in the externals 82.

When the double re-encrypted data C3-2 sent to the externals 82 is utilized, the double re-encrypted data C3-2 is decrypted using the second changeable key K2 by the decryption unit 84 of the changeable key encryption/decryption unit 83:

$$\exists 3 : C3 = D(C3 - 2, K2)$$
$$= D(E(C3, K2), K2),$$

further, the re-encrypted data C3 thus obtained is decrypted using the third changeable key K3 by the decryption unit 85 of the changeable key encryption/decryption unit 83:

$$\exists : M = D(C3, K3)$$
$$= D(E(M, K3), K3)$$

and the decrypted data M thus obtained is outputted to the display unit 86 or the like.

In the above embodiment, the third changeable key K3 is used by the changeable key encryption unit 80 and the second changeable key K2 is used by the changeable key encryption unit 87, while this may be performed in reverse order.

Also, it may be designed in a manner that the encryption unit 20 of the changeable key encryption/decryption unit 19 serves the function of the changeable key encryption unit 87.

While description has been given on the above in the case where the encryption unit 16 and the decryption unit 17 are contained in the unchangeable key encryption/decryption unit 15 and the encryption unit 20 and the decryption unit 21 are contained in the changeable key encryption/decryption unit 19, it goes without saying that these units 16, 17, 20 and 21 may be separately provided.

These operations can be easily achieved by providing a sub-computer arrangement having a CPU and a system-bus in the set-top box 12.

Description will be given on a variation, which is applied to an embodiment using a personal computer.

Figure 10:
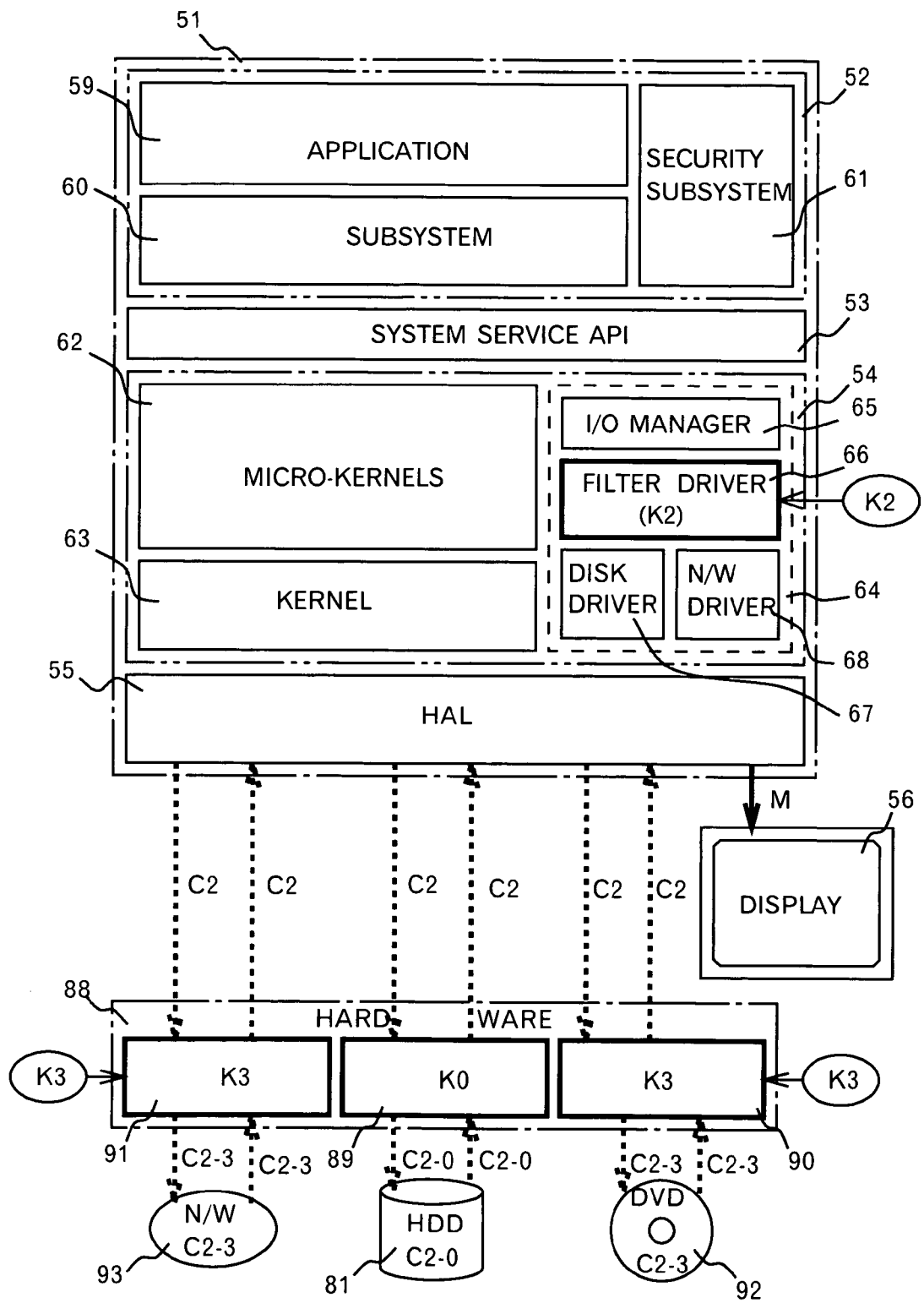
FIG. 10 shows a general arrangement of an eighth embodiment using a personal computer.

The eighth embodiment shown in FIG. 10 is a variation of the fourth embodiment shown in FIG. 5. In the embodiment, detailed description common to the fourth embodiment arrangement is not given here.

The eighth embodiment is different from the fourth embodiment in distinguishing between the cases where the decrypted data M is stored in a storage medium 81 such as a hard disk incorporated in or dedicated to the computer, and where it is stored in a removable medium 92 such as a DVD-RAM or is transferred externally via a network 93.

For this purpose, changeable key encryption units 90 and 91 are provided as hardware 88, in addition to the unchangeable key encryption/decryption unit 89. In a case where the copyrighted and decrypted data is stored in the hard disk 81 of the storage medium incorporated in or dedicated to the computer, it is double re-encrypted and decrypted using the unchangeable key K0 by the encryption/decryption unit 89 via a disk driver 67. In a case where the data is stored in the DVD-RAM 92 of the removable medium, it is double re-encrypted and decrypted using the third changeable key K3 by the encryption/decryption unit 90 via the disk driver 67. In a case where the data is transferred externally via the network 93, it is double re-encrypted and decrypted using the third changeable key K3 by the changeable key encryption/decryption unit 91 via a network driver 68.

Similar to the first embodiment shown in FIG. 2, the digital data supplied by broadcasting means such as digital terrestrial broadcasting, digital CATV broadcasting, digital satellite broadcasting, etc., by network means such as Internet, or by a digital storage medium such as a DVD, a CD, etc. is encrypted using a first changeable key K1 to prevent illegitimate use:

$$C1 = E(M, K1)$$

and is supplied. The encrypted digital data C1 thus supplied is decrypted by the operating system service 52 using the first changeable key K1 provided from the key center via the same route as or a route different from that of the encrypted digital data C1:

$$M = D(C1, K1)$$

and the decrypted data M is outputted to the display unit 56 or the like.

In cases where the decrypted data M is stored in the storage medium 81 incorporated in or dedicated to the computer, such as a hard disk, where it is stored in a medium such as the DVD-RAM, and where it is transferred externally via a network, the decrypted data M is re-encrypted by a filter driver 66 using the second changeable key K2 obtained from the key center or generated in the operating system service 52:

$$\forall 2: C2 = E(M, K2) = E(D(C1, K1), K2).$$

Further, when the re-encrypted data C2 is stored in a storage medium 81 incorporated in or dedicated to a computer, the re-encrypted data C2 is double re-encrypted using an unchangeable key K0 by the encryption/decryption unit 89 in the hardware 88:

$$\forall 2\text{-}0: C2\text{-}0 = E(C2, K0) = E(E(D(C1, K1), K2), K0)$$

and re-encrypted data C2-0 is stored in the hard disk 81 or the like.

In a case where the double re-encrypted data C2-0 stored in the storage medium 81 is utilized, the double re-encrypted data C2-0 read from the storage medium 81 is re-decrypted using the unchangeable key K0 by the encryption/decryption unit 89 in the hardware 88:

$$\exists 2: C2 = D(C2\text{-}0, K0) = D(E(E(D(C1, K1), K2), K0),$$

further, the re-decrypted data C2 is decrypted using the second changeable key K2 by the filter driver 66 having encryption/decryption function:

$$\exists M = D(C2, K2) = D(E(D(C1, K1), K2),$$

and the decrypted data M is outputted by the operating system of the computer to the display unit 56 or the like to be utilized.

When the re-encrypted data C2 is stored in a DVD-RAM of the removable medium, the re-encrypted data C2 is double re-encrypted using the third changeable key K3 by the changeable key encryption/decryption unit 90 of the hardware:

$$\forall 2\text{-}3: C2\text{-}3 = E(C2, K3) = E(E(D(C1, K1), K2), K3)$$

and double re-encrypted data C2-3 is stored in the removable medium, the DVD-RAM.

In a case where the double re-encrypted data C2-3 stored in the removable medium 92 is utilized, the double re-encrypted data C2-3 read from the removable medium 92 is re-decrypted using the third changeable key K3 obtained from the key center or generated in the operating system service 52 by the encryption/decryption unit 90 in the hardware:

$$\exists 2: C2 = E(C2\text{-}3, K3 = D(E(E(D(C1, K1), K2), K3),$$

further, the re-decrypted data C2 is decrypted using the second changeable key K2 by the filter driver 66 having encryption/decryption function:

$$\exists: M = D(C2, K2) = D(E(D(C1, K1), K2)$$

and the decrypted data M is outputted by the operating system of the computer to the display unit 56 or the like to be utilized.

When the re-encrypted data C2 is transferred externally via the network 93, the re-encrypted data C2 is double re-encrypted using the second changeable key K2 by the encryption/decryption unit 91:

$$\forall 2\text{-}3: C2\text{-}3 = E(C2, K3) = E(E(D(C1, K1), K2), K3)$$

and double re-encrypted data C2-3 is transferred externally via the network 93.

In a case where the double re-encrypted data C2-3 transferred from the outside via the network 88 is utilized, the encrypted re-encrypted data C2-3 is re-decrypted using the third changeable key K3 by the encryption/decryption unit 91:

$$\exists 2: C2 = E(C2\text{-}3, K3) = D(E(E(D(C1, K1), K2)K3),$$

further, the re-decrypted data C2 is decrypted using the second changeable key K2 by the filter driver 66 having encryption/decryption function:

$$\exists: M = D(C2, K2) = D(E(D(C1, K1), K2)$$

and the decrypted data M is outputted by the operating system of the computer to the display unit 56 or the like to be utilized.

When the re-encrypted data C2 is transferred outside via the network 93, the re-encrypted data C2 is double re-encrypted using the second changeable key K2 at the encryption/decryption unit 91:

$$\forall 2\text{-}3: C2\text{-}3 = E(C2,K3) = E(E(D(C1,K1),K2),K3)$$

and double re-encrypted data C2-3 is transferred outside via the network 93.

In a case where the double re-encrypted data C2-3 transferred from the outside via the network 88 is utilized, the encrypted data C2-3 is re-decrypted using the third changeable key K3 at the encryption/decryption unit 91:

$$\exists 2: C2 = E(C2\text{-}3,K3) = D(E(E(D(C1,K1),K2)K3),$$

further, the re-decrypted data C2 is decrypted using the second changeable key K2 at the filter driver 66 having encryption/decryption function:

$$\exists: M = D(C2,K2)D(E(D(C1,K1),K2)$$

and the decrypted data M is outputted by the operating system of the computer to the display unit 56 or the like to be utilized.

In the above embodiment, in order to facilitate the explanation, it has been described that the encryption/decryption units 90 and 91 are separate, but it goes without saying that these units may be a single unit.

The encryption/decryption as described above is managed by a real-time OS (RTOS) as already explained, with priority over other tasks in the HAL 55 in the operating system 51.

These operations can be easily achieved by designing the hardware 88 as the sub-computer arrangement having a CPU and a system-bus.

Figure 11:
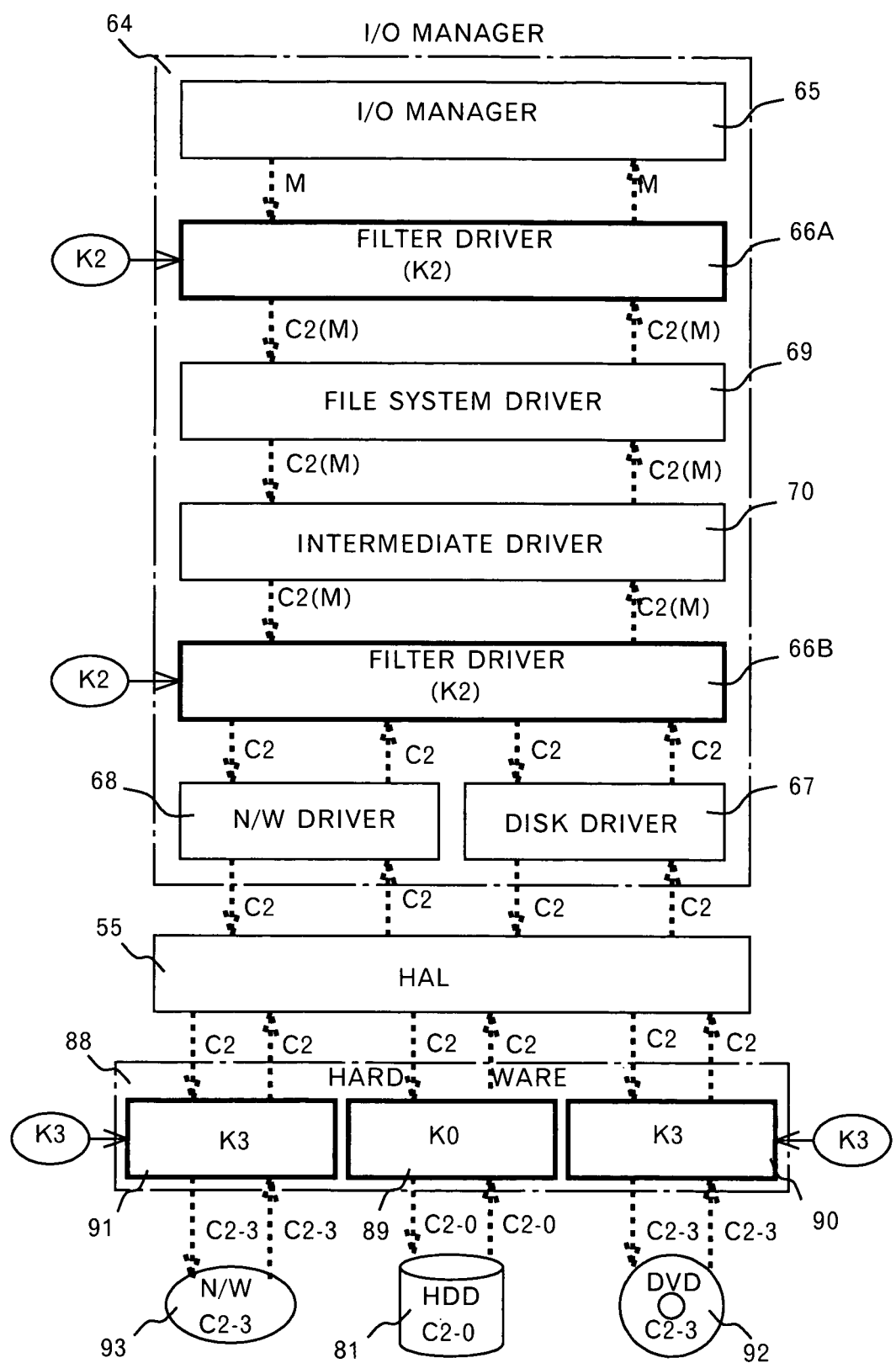
FIG. 11 illustrates a detailed description on the eighth embodiment.

FIG. 11 shows a concrete arrangement of the encryption/decryption using the I/O management micro-kernel 64 having the filter driver 66 which serves as the changeable key encryption/decryption processing of the eighth embodiment.

In the I/O management micro-kernel 64, a file system driver 69, an intermediate driver 70, and device drivers, i.e., a disk driver 67 and a network driver 68, are arranged from an upper hierarchy to a lower hierarchy. When necessary, a filter driver 66A or a filter driver 66B for performing changeable key encryption/decryption is inserted above the file system driver 69 or between the intermediate driver 70 and the device driver.

Because these filter drivers 66A and 66B can perform re-encryption/re-decryption, it is designed to have the filter driver 66A or 66B carry out the re-encryption/re-decryption processing and the management of crypt keys in this embodiment.

In cases where the copyrighted and decrypted data M is stored in a storage medium such as a hard disk, incorporated therein or dedicated thereto, where it is stored in a removable medium such as a DVD-RAM or where it is transferred outside via a network, the decrypted data M is re-encrypted by the filter driver 66A or 66B using the second changeable key K2 obtained from the key center or generated in the I/O management micro-kernel 64:

$$\forall 2: C2 = E(M,K2) = E(D(C1,K1),K2).$$

Further, in a case where the re-encrypted data C2 is stored in a computer-incorporated or -dedicated storage medium 81, the re-encrypted data C2 is double re-encrypted using the unchangeable key K0 by the encryption/decryption unit 89 in the hardware 88:

$$\forall 2\text{-}0: C2\text{-}0 = E(C2,K0) = E(E(D(C1,K1),K2),K0)$$

and double re-encrypted data C2-0 is stored in the hard disk 81 or the like.

When the double re-encrypted data C2-0 stored in the storage medium 81 is utilized, the double re-encrypted data C2-0 read from the storage medium 81 is re-decrypted using the unchangeable key K0 by the encryption/decrypted unit 89 in the hardware 88:

$$\exists 2: C2 = D(C2\text{-}0,K0) = D(E(E(D(C1,K1),K2),K0),$$

further, the re-decrypted data C2 is decrypted using the second changeable key K2 by the filter driver 66 having encryption/decryption function:

$$\exists: M = D(C2,K2) = D(E(D(C1,K1),K2)$$

and the decrypted data M is outputted by the operating system of the computer to the display unit 56 or the like to be utilized.

Also, in a case where the re-encrypted data C2 is stored in the removable medium such as a DVD-RAM, the re-encrypted data C2 is double re-encrypted using the third changeable key K3 obtained from the key center or generated in the I/O management micro-kernel 64, by the encryption/decryption unit 90 in the hardware 88:

$$\forall 2\text{-}3: C2\text{-}3 = E(C2,K3) = E(E(D(C1,K1),K2),K3)$$

and double re-encrypted data C2-3 is stored in a removable medium such as the DVD-RAM.

When the double re-encrypted data C2-3 stored in the removable medium 92 is utilized, the re-encrypted data C2-3 read from the removable medium 92 is re-decrypted using the third changeable key K3 by the encryption/decryption unit 90 in the hardware 88:

$$\exists 2: C2 = D(C2\text{-}3,K3) = D(E(E(D(C1,K1),K2),K3),$$

further, the re-decrypted data C2 is decrypted using the second changeable key K2 by the filter driver 66 having encryption/decryption function:

$$\exists: M = D(C2,K2) = D(E(D(C1,K1),K2)$$

and the decrypted data M is outputted by the operating system of the computer to the display unit 56 or the like to be utilized.

Also, in a case where the re-encrypted data C2 is transferred externally via the network 93, the re-encrypted data C2 is double re-encrypted using the second changeable key K2 by the encryption/decryption unit 91:

$$\forall 2\text{-}3: C2\text{-}3 = E(C2,K3) = E(E(D(C1,K1),K2),K3)$$

and double re-encrypted data C2-3 is transferred externally via the network 93.

When the double re-encrypted data C2-3 transferred from the outside via the network 93 is utilized, the re-encrypted data C2-3 is re-decrypted using the third changeable key K3 by the encryption/decryption unit 91:

$$\exists 2: C2 = E(C2\text{-}3,K3) = D(E(E(D(C1,K1),K2),K3),$$

further, the re-decrypted data C2 is decrypted using the second changeable key K2 by the filter driver 66 having encryption/decryption function:

$$\exists: M = D(C2,K2) = D(E(D(C1,K1),K2)$$

and the decrypted data M is outputted by the operating system of the computer to the display unit 56 or the like to be utilized.

It is generally practiced that the specification of the device driver is changed to fit the particular computer using the operating system or according to the corresponding device modified.

By providing the device driver with the function for the re-encryption/re-decryption processing and the management of a key, it allows the easy incorporation of the function into the kernel of the operation system. Also, by re-encrypting the data using the second changeable key K2 before it is re-encrypted using the unchangeable key K0, it is very difficult to cryptanalyze the encrypted data, even if the unchangeable key is discovered by others, without finding out the second changeable key K2 because the data is also encrypted using the second changeable key K2.

Further, because the second changeable key K2 is used first and then, is used after the unchangeable key K0 is used, high security of the key is ensured. Because the second changeable key K2 is used first, it also strongly governs the encrypted data.

However, when the second changeable key K2 is repeatedly used, there is a possibility it may be discovered by others. In such a case, it is preferably designed in such a manner that the second changeable key K2 used for encryption is abandoned and it is again obtained from the key center or generated, when necessary for decryption, as described in Japanese Patent Laid-Open Publication 185448/1996 (EP0704885A2, U.S. Ser. No. 08/536,749).

For security purposes, K1, K2, K3, and K0 may be based on different crypt algorithms.

These operations can be easily implemented as a sub-computer structure having a CPU and a system bus.

In order to perform re-encryption/re-decryption of digital data as above, it is necessary to add, to the digital data, information to indicate that storage or transfer of the digital data is restricted. In a case where the digital data is stored or transferred without being edited, illegitimate use of the digital data can be prevented by the method and the apparatus for re-encryption/re-decryption as described above.

However, when the digital data is edited, there is a possibility that the information to identify the restriction of storage or transfer may be lost.

In such the case, it may be designed in a manner that all of the data are re-encrypted/re-decrypted using a key specific to the device (a master key).

In so doing, even the digital data which has been edited, for example, by the "cut & paste" method, can be prevented from illegitimate use by re-encryption/re-decryption.

Also, it may be designed in a manner that the digital data without the information to identify the restriction of storage or transfer only is re-encrypted/re-decrypted using the master key, and that the digital data provided with the information to identify the restriction of storage or transfer is re-encrypted/re-decrypted using the method and the apparatus as explained in the above embodiments.

In a case where the copyrighted and encrypted digital data is utilized in a specific device such as a set-top box, illegitimate storing, copying or transferring can be relatively easily prevented. Also, in a case where the copyrighted and encrypted digital data is utilized on a computer, the management of storing, copying or transferring the decrypted digital data can be executed by using the decryption/re-encryption apparatus described in Japanese Patent Laid-Open Publication 287014/1996 (U.S. Pat. No. 5,867,579; EP0715241A2) or by using the decryption/re-encryption apparatus described in U.S. Pat. No. 5,805,706.

However, the digital data decrypted for the purpose of displaying or printing is present on the bus of the computer, and it is possible to store, copy or transfer the decrypted digital data via a device connected to the bus. In the following, description will be given on a copyright management apparatus, which solves this problem.

Figure 12:
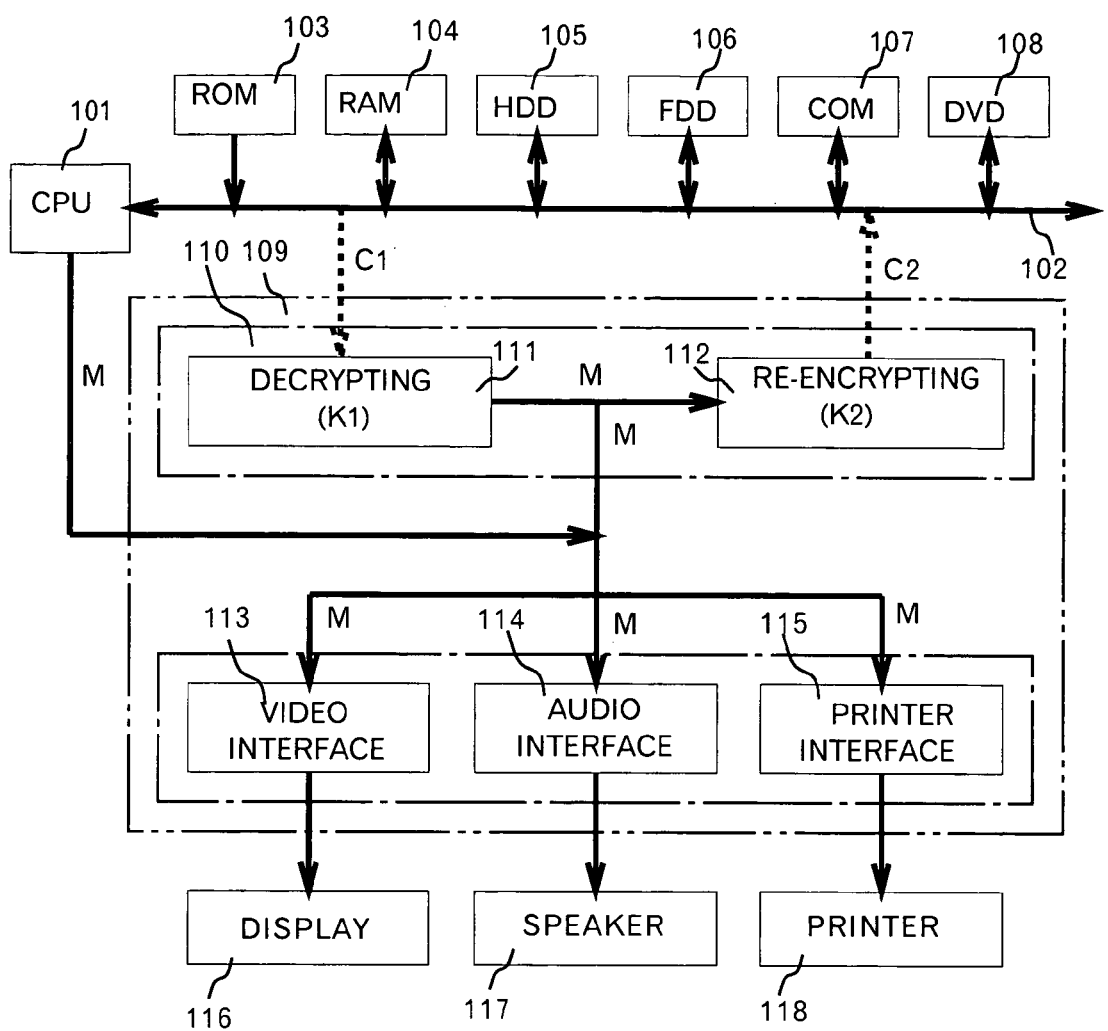
FIG. 12 illustrates an embodiment of a copyright management apparatus.

FIG. 12 shows a structural example of a copyright management apparatus, in which a first changeable key and a second changeable key are used.

Also, this copyright management apparatus can be realized in a configuration such as a sub-board, a PCMCIA card, an IC card or an IC package for the purpose of security.

In FIG. 12, reference numeral 101 represents a CPU. A ROM 103, a RAM 104, a hard disk drive 105, a flexible disk drive 106, a CD-ROM drive 107, a modem 108, etc. are connected to a system-bus 102 connected to the CPU 101.

Reference numeral 109 represents a copyright management apparatus, which comprises a decryption/encryption unit 110, a video interface 113, an audio interface 114, and a printer interface 115.

A display unit 116, a speaker 117 and a printer 118 are connected to the video interface 113, the audio interface 114, and the printer interface 115 respectively on the outer side of the computer.

The decryption/encryption unit 110 comprises a decryption unit 111 and an encryption unit 112.

The decryption unit 111 and the encryption unit 112 of the decryption/encryption unit 110 are connected to the system-bus 102 of the computer. The video interface 113, the audio interface 114, and the printer interface 115 are connected to the decryption unit 111.

This arrangement can be easily achieved by designing the copyright management apparatus 109 as a sub-computer arrangement having a CPU and a system-bus.

In cases where the decrypted digital data M is stored in the hard disk drive 105, where it is copied at the flexible disk drive 106 or where it is transferred via the modem 108, the decrypted digital data is re-encrypted using the second changeable key K2 by the encryption unit 112:

$$\forall 2: C2 = E(M, K2)$$
$$= E(D(C1, K1), K2),$$

the re-encrypted digital data C2 is supplied to the system-bus 102, and is stored in the hard disk drive 105, copied in the flexible disk drive 106 or transferred via the modem 108.

The encrypted digital data C1 encrypted using the first changeable key K1 is supplied to the decryption unit 111 from the system-bus 102, and is decrypted using the first changeable key K1:

$$M=D(C1,K1).$$

In a case where the decrypted digital data M is outputted to the display unit 116 or the speaker 117, it is turned to analog at the video interface 113 and the audio interface 114 in the copyright management apparatus 109 and is outputted in a predetermined signal form.

When the decrypted digital data M is outputted to the printer 118, print data is outputted via the printer interface 115.

When this copyright management apparatus 109 is used, the decrypted digital data other than the data outputted to the printer is not present outside the copyright management apparatus 109. Because the data outputted to the printer is still data, digital data of a moving picture or of audio data is not present outside the copyright management apparatus 109.

In the computer, non-encrypted digital data is also present in addition to the decrypted digital data.

In order to process the non-encrypted digital data and the decrypted data by distinguishing between them, it is necessary to provide a video interface, an audio interface and a printer interface, and this would make the system more complicated and costly. To avoid such situation, it may be designed in a manner that non-encrypted digital data is processed at the video interface 113 and the audio interface 114 in the copyright management system 109.

Figure 13:
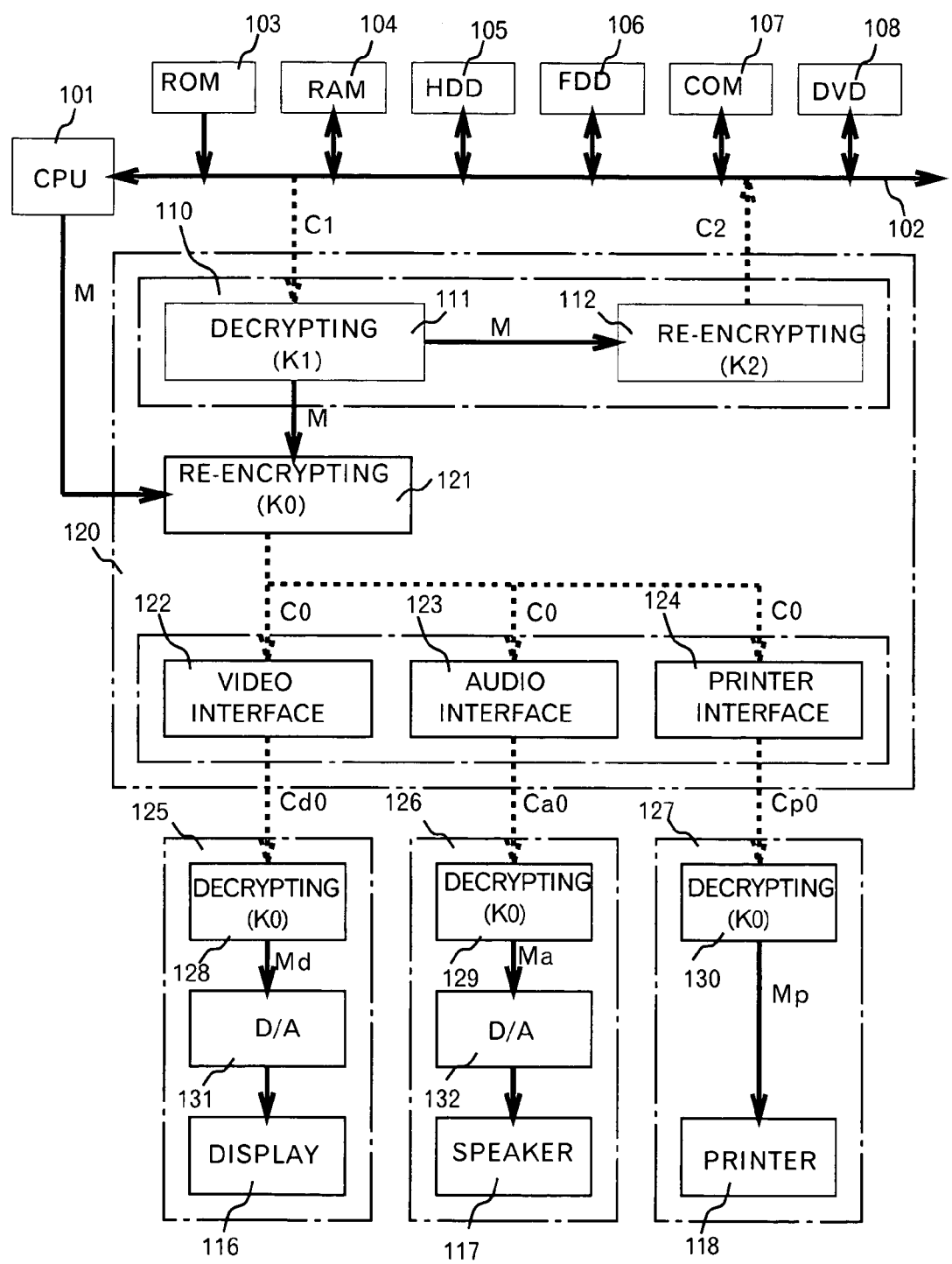
FIG. 13 illustrates another embodiment of the copyright management apparatus.

FIG. 13 shows another arrangement example of a copyright management apparatus, in which an unchangeable key is used in addition to the first and the second changeable keys.

This copyright management apparatus can be realized in a configuration such as a sub-board, a PCMCIA card, an IC card, or an IC package for security purpose.

In FIG. 13, reference numeral 101 represents a CPU. A ROM 103, a RAM 104, a hard disk drive 105, a flexible disk drive 106, a CD-ROM drive 107, a modem 108, etc. are connected to a system-bus 102 connected to the CPU 101.

Reference numeral 120 represents a copyright management apparatus. The copyright management apparatus 120 has, in addition to the decryption/encryption unit 110, an unchangeable key encryption unit 121, a crypt video interface 122, a crypt audio interface 123, and a crypt printer interface 124.

The decryption/encryption unit 110 has a decryption unit 111 and an encryption unit 112.

Also, an encrypted digital video display unit 125, an encrypted digital audio player 126, and an encrypted digital data printer 127, which arranged outside of the computer, are connected to the crypt video interface 122, the crypt audio interface 123, and the crypt printer interface 124.

The decryption unit 111 and the encryption unit 112 of the decryption/encryption unit 110 are both connected to the computer system-bus 102. The unchangeable key encryption unit 121 is further connected to the decryption unit 111.

The crypt video interface 122, the crypt audio interface 123, and the crypt printer interface 124 are connected to the unchangeable key encryption unit 121.

The encrypted data display unit 125 is connected to the crypt video interface 122, the encrypted audio data player 126 is connected to the crypt audio interface 123 and the encrypted data printer 127 is connected to the crypt printer interface 124.

The above arrangement can be easily realized by designing the copyright management apparatus 120 as a sub-computer arrangement having a CPU and a system-bus.

The encrypted data display unit 125 has an unchangeable key decryption unit 128 connected to the crypt video interface 122, a D/A converter 131 connected to the unchangeable key decryption unit 128, and a display unit 116 connected to the D/A converter 131.

The encrypted audio data player 126 has an unchangeable key decryption unit 129 connected to the crypt audio interface 123, a D/A converter 132 connected to the unchangeable key decryption unit 129, and a speaker 117 connected to the D/A converter 132.

The encrypted data printer 127 has an unchangeable key decryption unit 130 connected to the crypt printer interface 124 and a printer 118 connected to the unchangeable key decryption unit 130.

Needless to say, the encrypted data display unit 125, the encrypted audio data player 126 and the encrypted data printer 127 have other components such as an amplifier.

The encrypted digital data C1 encrypted using the first changeable key K1 is supplied to the decryption unit 111 from the system-bus 102, and it is decrypted using the first changeable key K1:

$M=D(C1,K1)$.

When the decrypted digital data M is stored at the hard disk drive 105 or is copied at the flexible disk drive 105 or is transferred via the modem 108, it is re-encrypted using the second changeable key K2 by the re-encryption unit 115:

$$\forall = 2: C2 = E(M, K2)$$
$$= E(D(C1, K1), K2),$$

the re-encrypted digital data C2 is supplied to the system-bus 102, and it is stored at the hard disk drive 105, copied at the flexible disk drive 105, or transferred via the modem 108.

When the decrypted digital data M is stored at the hard disk drive 105 or is copied at the flexible disk drive 106 or is transferred via the modem 108, it is re-encrypted using the second changeable key K2 by the encryption unit 112:

$$\forall = 2: C2 = E(M, K2)$$
$$= E(D(C1, K1), K2),$$

the re-encrypted digital data C2 is supplied to the system-bus 102, and it is stored at the hard disk drive 105, copied at the flexible disk drivel 106, or transferred via the modem 108.

When the encrypted display signal Cd0 is inputted to the encrypted data display unit 125 from the crypt video interface 122, it is decrypted using the unchangeable key K0 at the unchangeable key decryption unit 128:

$Md=D(Cd0,K0)$, the decrypted display signal MA is converted to a displayable analog signal by the D/A converter 131 and it is displayed on the display unit 116.

If the display unit 116 is a digital display unit, which can display the digital data as it is, the D/A converter 131 is unnecessary.

When the encrypted audio signal Ca0 is inputted to the encrypted audio data player 126 from the crypt audio interface 123, it is decrypted using the unchangeable key K0 by the unchangeable key decryption unit 129:

$Ma=D(Ca0,K0)$, the decrypted audio signal Ma is converted to a playable analog signal by the D/A converter 132, and it is played by the speaker 117.

The encrypted print signal Cp0 inputted to the encrypted data printer 127 from the crypt printer interface 124 is decrypted using the unchangeable key K0 by the unchangeable key decryption unit 130:

$Mp=D(Cp0,K0)$ and the decrypted print signal Mp is printed by the printer 118.

When this copyright management apparatus 120 is used, no decrypted data is present outside the copyright management apparatus 120.

As aforementioned, non-encrypted digital data is also present in addition to the decrypted digital data in the computer.

In order to process the non-encrypted digital data and the decrypted digital data by distinguishing between them, it is necessary to provide a video interface, an audio interface and a printer interface, and this would make the system more complicated and costly. To avoid such situation, it may be designed in a manner that the non-encrypted digital data is processed by the unchangeable key re-encryption unit 121 of the copyright management apparatus 120.

Figure 14:
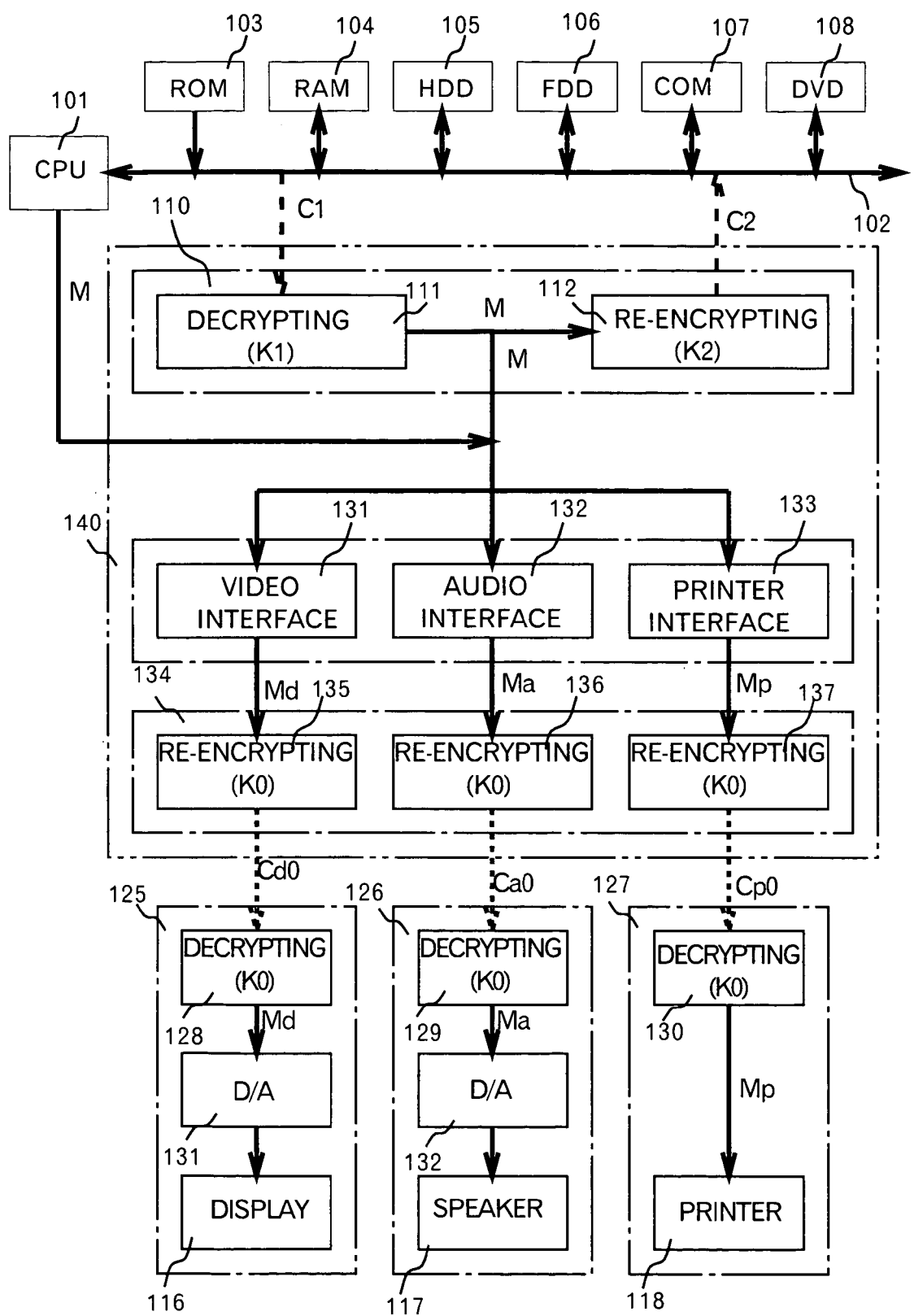
FIG. 14 illustrates still another embodiment of the copyright management apparatus.

FIG. 14 shows another arrangement example of the copyright management apparatus, in which an unchangeable key encryption unit is provided to follow the video interface, the audio interface and the printer interface.

The copyright management apparatus can be realized in a configuration such as a sub-board, a PCMCIA card, an IC card or an IC package for security purpose.

In FIG. 14, reference numeral 101 represents a CPU. A ROM 103, a RAM 104, a hard disk drive 105, a flexible disk drive 106, a CD-ROM drive 107, a modem 108, etc., are connected to a system-bus 102 connected to the CPU 101.

Reference numeral 140 represents a copyright management apparatus, which comprises a decryption/encryption unit 110, a video interface 113, an audio interface 114, a printer interface 141, and an unchangeable key encryption unit 134.

The decryption/encryption unit 110 has a decryption unit 111 and an re-encryption unit 112.

The unchangeable key encryption unit 134 has an unchangeable key encryption unit for video 135, an unchangeable key encryption unit for audio 136, and an unchangeable key encryption unit for print 137. The unchangeable key encryption units for video, audio and print may be arranged in a single unit if it is available for sufficient encryption capacity.

The decryption unit 111 and the re-encryption unit 112 of the decryption/encryption unit 110 are connected to the system-bus 102 of the computer. Further, the video interface 131, the audio interface 132 and the printer interface 133 are connected to the decryption unit 111, and the unchangeable key encryption unit for video 135, the unchangeable key encryption unit for audio 136 and the unchangeable key encryption unit for print 137 are connected to these interfaces.

An encrypted digital video display unit 125, an encrypted digital audio player 126 and an encrypted digital data printer 127 arranged outside the computer are connected respectively to the unchangeable key encryption unit for video 135, the unchangeable key encryption unit for audio 163 and the unchangeable key encryption unit for print 137.

The above arrangement can be easily realized by designing the copyright management apparatus 140 as a sub-computer arrangement having a CPU and a system-bus.

The encrypted data display unit 125 has an unchangeable key decryption unit 128 connected to the unchangeable key encryption unit for video 135, a D/A converter 131 connected to the unchangeable key decryption unit 128, and a display unit 116 connected to the D/A converter 131.

The encrypted audio data player 126 has an unchangeable key decryption unit 129 connected to the unchangeable key encryption unit for audio 136, a D/A converter 132 connected to the unchangeable key decryption unit 129, and a speaker 117 connected to the D/A converter 132.

The encrypted data printer 127 has an unchangeable key decryption unit 130 connected to the unchangeable key encryption unit for print 137 and a printer 118 connected to the unchangeable key decryption unit 130.

Needless to say, the encrypted data display unit 125, the encrypted audio data player 126 and the encrypted data printer 127 have other components such as an amplifier.

The encrypted digital data C1 encrypted using the first changeable key K1 is supplied to the decryption unit 111 from the system-bus 102 and it is decrypted using the first changeable key K1:

$$M = D(C1, K1).$$

When the decrypted digital data M is stored at the hard disk drive 105 or copied at the flexible disk drive 106 or transferred via the modem 108, it is re-encrypted using the second changeable key K2 by the encryption unit 112:

$$\forall 2 : C2 = E(M, K2)$$
$$= E(D(C1, K1), K2),$$

the re-encrypted digital data C2 is supplied to the system-bus 102, and it is then stored at the hard disk drive 105, copied at the flexible disk drive 106 or transferred via the modem 108.

When the decrypted digital data M is outputted to the encrypted data display unit 125, the encrypted audio data player 126 or the encrypted data printer 127, the decrypted digital data M is arranged to digital data Md, Ma and Mp to be provided to the display unit 116, the speaker 117 and the printer 118 respectively at the video interface 131, the audio interface 132 and the printer interface 133 in the copyright management apparatus 140. Then, these digital data are encrypted using the unchangeable key K0 by the unchangeable key encryption unit for video 135, the unchangeable key encryption unit for audio 136 and the unchangeable key encryption unit for print 137:

$$Cd0 = E(Md, K0)$$
$$Ca0 = E(Ma, K0)$$
$$Cp0 = E(Mp, K0)$$

and the encrypted display signal Cd0, the encrypted audio signal Ca0 and the encrypted print signal Cp0 are outputted.

The encrypted display signal Cd0 is inputted to the encrypted data display unit 125 from the unchangeable key encryption unit for video 135, and it is decrypted using the unchangeable key K0 at the unchangeable key decryption unit 128:

$$Md = D(Cd0, K0).$$

The decrypted display signal Md is converted to a displayable analog signal at the D/A converter 131, and is displayed on the display unit 116.

If the display unit 116 is a digital display unit, which can display the digital data as it is, the D/A converter 131 is unnecessary.

The encrypted audio signal Ca0 is inputted to the encrypted audio data player 126 from the unchangeable key encryption unit 136, and it is decrypted using the unchangeable key K0 by the unchangeable key decryption unit 129:

$$Ma = D(Ca0, K0).$$

The decrypted audio signal Ma is converted to a playable analog signal at the D/A converter 132, and is played at the speaker 116.

The encrypted print signal Cp0 is inputted to the encrypted data printer 127 from the unchangeable key encryption unit 137, and it is decrypted using the unchangeable key K0:

$$Mp=D(Cp0,K0).$$

The decrypted print signal Mp is printed by the printer 118.

When this copyright management apparatus 140 is used, no decrypted data is present outside the copyright management apparatus 140.

As aforementioned, non-encrypted digital data is also present in addition to the decrypted digital data in the computer.

In order to process the non-encrypted digital data and the decryption data by distinguishing between them, it is necessary to provide a video interface, an audio interface and a printer interface, and this would make the system more complicated and costly. To avoid such situation, it may be designed in a manner that the non-encrypted digital data is processed at the video interface 131, the audio interface 132 and the printer interface 133 of the copyright management apparatus 140.

A secret-key cryptosystem is often used as a cryptosystem for encrypting digital data. The most popular DES (Data Encryption Standard) in the secret-key cryptosystems carries out encryption/decryption per 64-bit block unit of data. It is a typical block cipher method in the secret-key cryptosystem and has been widely adopted. Using this encryption/decryption per block processing allows the realization of a more high speed encryption/decryption processing.

In doing so, a plurality of encryption units and decryption units are provided in the encryption/decryption unit. It allows these plurality of encryption units and decryption units to be, in order, allocated the encryption/decryption processings of data blocks to be carried out. And then, encryption/decryption processing results, thus obtained, are synthesized.

Further, it brings a supplemental effect that it is possible to use a respective crypt key for each data block and also to adopt a respective cryptosystem for each data block. Then, more high security for digital data is possible.

I claim:

1. A method for protecting decrypted digital data from illegitimate use, said method comprising:
    encrypting said decrypted digital data using a changeable key to produce changeable key re-encrypted digital data;
    encrypting said changeable key re-encrypted digital data using an unchangeable key to produce changeable-unchangeable keys double re-encrypted digital data to be stored, copied and/or transferred, wherein said unchangeable key is capable of being operationally unchangeable at least during said encrypting of said changeable key re-encrypted digital data;
    decrypting said copied, stored and/or transferred changeable-unchangeable keys double re-encrypted digital data using said unchangeable key to said changeable key re-encrypted digital data; and
    decrypting said changeable key re-encrypted digital data using said changeable key to said decrypted digital data.

2. The method of claim 1 wherein said unchangeable key is located in a device.

3. A method for protecting decrypted digital data from illegitimate use, comprising:
    encrypting said decrypted digital data using an unchangeable key to produce unchangeable key re-encrypted digital data, wherein said unchangeable key is capable of being operationally unchangeable at least during said encrypting of said decrypted digital data;
    encrypting said unchangeable key re-encrypted digital data using a changeable key to produce unchangeable-changeable key double re-encrypted digital data to be stored, copied and/or transferred;
    decrypting said copied, stored and/or transferred unchangeable-changeable keys double re-encrypted digital data using said changeable key to said unchangeable key re-encrypted digital data; and
    decrypting said unchangeable key re-encrypted digital data using said unchangeable key to said decrypted digital data.

4. The method of claim 3 wherein said unchangeable key is located in a device.

5. The method according to claim 1 or 3, wherein said encrypting and decrypting using said changeable key are carried out by software executed by a computer.

6. The method according to claim 1 or 3, wherein said encrypting and decrypting using said changeable key are carried out by hardware.

7. The method according to claim 2 or 4, wherein said changeable key is supplied externally from said device.

8. The method according to claim 2 or 4, wherein said changeable key is generated in said device.

9. The method according to claim 2 or 4, wherein said encrypting and decrypting using said unchangeable key are carried out by software executed by a computer.

10. The method according to claim 1 or 3, wherein said encrypting and decrypting using said unchangeable key are carried out by hardware.

11. The method according to claim 2 or 4, wherein said unchangeable key is already placed in said device.

12. The method according to claim 2 or 4, wherein said unchangeable key is generated in said device.

13. The method according to claim 2 or 4, wherein said unchangeable key is supplied externally from said device.

14. The method according to claim 2 or 4, wherein said unchangeable key is specific to said device.

15. The method according to claim 2 or 4 wherein said unchangeable key is not specific to said device.

16. An apparatus for protecting decrypted digital data from illegitimate use, said apparatus comprising:
    a changeable key encryption unit capable of encrypting said decrypted digital data using a changeable key to produce changeable key re-encrypted digital data;
    an unchangeable key encryption unit capable of encrypting said changeable key re-encrypted digital data using an unchangeable key to produce changeable-unchangeable keys double re-encrypted digital data to be stored, copied and/or transferred, wherein said unchangeable key is capable of being operationally unchangeable at least during production of said changeable-unchangeable keys double re-encrypted digital data;
    an unchangeable key decryption unit capable of decrypting said copied, stored and/or transferred changeable-unchangeable keys double re-encrypted digital data using said unchangeable key to said changeable key re-encrypted digital data; and
    a changeable key decryption unit capable of decrypting said changeable key re-encrypted digital data using said changeable key to said decrypted digital data.

17. The apparatus of claim 16 wherein said unchangeable key is located in a device.

18. An apparatus for protecting decrypted digital data from illegitimate use, said apparatus comprising:

an unchangeable key encryption unit capable of encrypting said decrypted digital data using an unchangeable key to produce unchangeable key re-encrypted digital data, wherein said unchangeable key is capable of being operationally unchangeable at least during production of said unchangeable key re-encrypted digital data;

a changeable key encryption unit capable of encrypting said unchangeable key re-encrypted digital data using a changeable key to produce changeable-unchangeable keys double re-encrypted digital data to be stored, copied and/or transferred;

a changeable key decryption unit capable of decrypting said copied, stored and/or transferred changeable-unchangeable keys double re-encrypted digital data using said changeable key to said unchangeable key re-encrypted digital data; and an unchangeable key decryption unit capable of decrypting said unchangeable key re-encrypted digital data using said unchangeable key to said decrypted digital data.

19. The apparatus of claim 18 wherein said unchangeable key is located in a device.

20. The apparatus according to claim 16 or 18, in which encrypting and decrypting using said changeable key are carried out by software executed by a computer.

21. The apparatus according to claim 16 or 18, in which encrypting and decrypting using said changeable key are carried out by hardware.

22. The apparatus according to claim 17 or 19, wherein said changeable key is supplied externally from said device.

23. The apparatus according to claim 17 or 19, wherein said changeable key is generated in said device.

24. The apparatus according to claim 16 or 18, in which encrypting and decrypting using said unchangeable key are carried out by software executed by a computer.

25. The apparatus according to claim 16 or 18, in which encrypting and decrypting using said unchangeable key are carried out by hardware.

26. The apparatus according to claim 17 or 19, wherein said unchangeable key is already placed in said device.

27. The apparatus according to claim 17 or 19, wherein said unchangeable key is generated in said device.

28. The apparatus according to claim 17 or 19, wherein said unchangeable key is supplied externally from said device.

29. The apparatus according to claim 17 or 19, wherein said unchangeable key is specific to said device.

30. The apparatus according to claim 17 or 19, wherein said unchangeable key is not specific to said device.

31. A method for protecting decrypted digital data from illegitimate use, said decrypted digital data being decrypted from digital data encrypted using a first changeable key, said method comprising:

encrypting said decrypted digital data using a second changeable key to produce second changeable key re-encrypted digital data;

encrypting said second changeable key re-encrypted digital data using an unchangeable key to produce unchangeable second changeable keys double re-encrypted digital data to be stored, wherein said unchangeable key is capable of being operationally unchangeable at least during said encrypting of said second changeable key re-encrypted digital data;

decrypting said stored unchangeable-second changeable keys double re-encrypted digital data using said unchangeable key to said second changeable key re-encrypted digital data;

encrypting said second changeable key re-encrypted digital data using a third changeable key to produce third changeable-second changeable keys double re-encrypted digital data to be copied and/or transferred;

decrypting said copied and/or transferred third changeable-second changeable keys double re-encrypted digital data using said third changeable key to said second changeable key re-encrypted digital data; and decrypting said second changeable key re-encrypted digital data using said second changeable key to said decrypted digital data.

32. The method of claim 31 wherein said unchangeable key is located in a device.

33. A method for protecting decrypted digital data from illegitimate use, said decrypted digital data being decrypted from digital data encrypted using a first changeable key, said method comprising:

encrypting said decrypted digital data using an unchangeable key to produce unchangeable key re-encrypted digital data, wherein said unchangeable key is capable of being operationally unchangeable at least during said encrypting of said decrypted digital data, and encrypting said unchangeable key re-encrypted digital data using a second changeable key to produce second changeable-unchangeable keys double re-encrypted digital data to be stored;

decrypting said stored second changeable-unchangeable keys double re-encrypted digital data using said second changeable key to said unchangeable key re-encrypted digital data;

decrypting said unchangeable key re-encrypted digital data using said unchangeable key to said decrypted digital data;

encrypting said decrypted digital data using a third changeable key to produce third changeable key re-encrypted digital data, and encrypting said third changeable key re-encrypted digital data using said second changeable key to produce second changeable-third changeable keys double re-encrypted digital data to be copied and/or transferred;

decrypting said copied and/or transferred second changeable-third changeable keys double re-encrypted digital data using said second changeable key to said third changeable key re-encrypted digital data; and decrypting said third changeable key re-encrypted digital data using said third changeable key to said decrypted digital data.

34. The method of claim 33 wherein said unchangeable key is located in a device.

35. The method according to claim 31 or 33 wherein said encrypting and decrypting using said second changeable key are carried out by software executed by a computer.

36. The method according to claim 31 or 33 wherein said encrypting and decrypting using said second changeable key are carried out by hardware.

37. The method according to claim 32 or 34 wherein said second changeable key is supplied externally from said device.

38. The method according to claim 32 or 34 wherein said second changeable key is generated in said device.

39. The method according to claim 31 or 33 wherein said encrypting and decrypting using said third changeable key are carried out by software executed by a computer.

40. The method according to claim 31 or 34 wherein said encrypting and decrypting using said third changeable key are carried out by hardware.

41. The method according to claim 32 or 34 wherein said third changeable key is supplied externally from said device.

42. The method according to claim 32 or 34 wherein said third changeable key is generated in said device.

43. The method according to claim 31 or 33 wherein said encrypting and decrypting using said unchangeable key are carried out by software executed by a computer.

44. The method according to claim 31 or 33 wherein said encrypting and decrypting using said unchangeable key are carried out by hardware.

45. The method according to claim 32 or 34 wherein said unchangeable key is already placed in said device.

46. The method according to claim 32 or 34 wherein said unchangeable key is generated in said device.

47. The method according to claim 32 or 34 wherein said unchangeable key is supplied externally from said device.

48. The method according to claim 32 or 34 wherein said unchangeable key is specific to said device.

49. The method according to claim 32 or 34 wherein said unchangeable key is not specific to said device.

50. An apparatus for protecting decrypted digital data from illegitimate use, said decrypted digital data being decrypted from digital data encrypted using a first changeable key, said apparatus comprising:
   a second changeable key encryption unit capable of encrypting said decrypted digital data using a second changeable key to produce second changeable key re-encrypted digital data;
   an unchangeable key encryption unit capable of encrypting said second changeable key re-encrypted digital data using an unchangeable key to produce unchangeable-second changeable keys double re-encrypted digital data to be stored, wherein said unchangeable key is capable of being operationally unchangeable at least during production of said unchangeable-second changeable keys double re-encrypted digital data;
   an unchangeable key decryption unit capable of decrypting said stored unchangeable-second changeable keys double re-encrypted digital data using said unchangeable key to said second changeable key re-encrypted digital data;
   a third changeable key encryption unit capable of encrypting said second changeable key re-encrypted digital data using a third changeable key to produce third changeable-second changeable keys double re-encrypted digital data to be copied and/or transferred;
   a third changeable key decryption unit capable of decrypting said copied and/or transferred changeable-second changeable keys double re-encrypted digital data using said third changeable key to said second changeable key re-encrypted digital data; and
   a second changeable key decryption unit capable of decrypting said second changeable key re-encrypted digital data using said second changeable key to decrypted digital data.

51. The apparatus of claim 50 wherein said unchangeable key is located may be in a device.

52. An apparatus for protecting decrypted digital data from illegitimate use, said decrypted digital data being decrypted from digital data encrypted using a first changeable key, said apparatus comprising:
   an unchangeable key encryption unit capable of encrypting said decrypted digital data using an unchangeable key to produce unchangeable key re-encrypted digital data, wherein said unchangeable key is capable of being operationally unchangeable at least during production of said unchangeable key re-encrypted digital data, and a second changeable key encryption unit capable of encrypting said unchangeable key re-encrypted digital data using a second changeable key to produce second changeable-unchangeable key double re-encrypted digital data to be stored;
   a second changeable key decryption unit capable of decrypting said stored second changeable-unchangeable keys double re-encrypted digital data using said second changeable key to unchangeable key re-encrypted digital data, and an unchangeable key decryption unit capable of decrypting said unchangeable key re-encrypted digital data using said unchangeable key to decrypted digital data;
   a third changeable key encryption unit capable of encrypting said decrypted digital data using a third changeable key to produce third changeable key re-encrypted digital data, and a second changeable key encryption unit capable of encrypting said third changeable key re-encrypted digital data using said second changeable key to produce second changeable-third changeable keys double re-encrypted digital data to be copied and/or transferred; and a second changeable key decryption unit capable of decrypting said copied and/or transferred second changeable-third changeable keys double re-encrypted digital data using said second changeable key to said third changeable key re-encrypted digital data, and a third changeable key decryption unit capable of decrypting said third changeable key re-encrypted digital data using said third changeable key to decrypted digital data.

53. The apparatus of claim 52 wherein said unchangeable key is located in a device.

54. The apparatus according to claim 50 or 52 wherein said encrypting and decrypting using said second changeable key are carried out by software executed by a computer.

55. The apparatus according to claim 50 or 52 wherein said encrypting and decrypting using said second changeable key are carried out by hardware.

56. The apparatus according to claim 51 or 53 wherein said second changeable key is supplied externally from said device.

57. The apparatus according to claim 51 or 53 wherein said second changeable key is generated in said device.

58. The apparatus according to claim 51 or 53 wherein said encrypting and decrypting using said third changeable key are carried out by software executed by a computer.

59. The apparatus according to claim 50 or 52 wherein said encrypting and decrypting using said third changeable key are carried out by hardware.

60. The apparatus according to claim 51 or 53 wherein said third changeable key is supplied externally from said device.

61. The apparatus according to claim 51 or 53 wherein said third changeable key is generated in said device.

62. The apparatus according to claim 50 or 52 wherein said encrypting and decrypting using said unchangeable key are carried out by software executed by a computer.

63. The apparatus according to claim 50 or 52 wherein said encrypting and decrypting using said unchangeable key are carried out by hardware.

64. The apparatus according to claim 51 or 53 wherein said unchangeable key is already placed in said device.

65. The apparatus according to claim 51 or 53 wherein said unchangeable key is generated in said device.

66. The apparatus according to claim 51 or 53 wherein said unchangeable key is supplied externally from said device.

67. The apparatus according to claim 51 or 53 wherein said unchangeable key is specific to said device.

68. The apparatus according to claim 51 or 53 wherein said unchangeable key is not specific to said device.

69. A method for protecting digital data from illegitimate use, said method comprising:
  determining whether said digital data is subject to be protected or not;
  encrypting said digital data, determined to be protected, using an unchangeable key to produce unchangeable key encrypted digital data, wherein said unchangeable key is capable of being operationally unchangeable at least during said encrypting of said digital data;
  storing, copying and/or transferring said unchangeable key encrypted digital data;
  decrypting said stored, copied and/or transferred unchangeable key encrypted digital data using said unchangeable key to decrypted digital data; and
  utilizing said stored, copied and/or transferred unchangeable key encrypted digital data and said decrypted digital data.

70. The method of claim 69 wherein said unchangeable key is located in a device.

71. The method according to claim 69, wherein said encrypting and decrypting using said unchangeable key are carried out by software executed by a computer.

72. The method according to claim 69, wherein said encrypting and decrypting using said unchangeable key are carried out by hardware.

73. The method according to claim 69, in which encrypting and decrypting using said unchangeable key are controlled by identifying information which is added to said digital data.

74. The method according to claim 73, in which encrypting and decrypting are carried out if said identifying information is present.

75. The method according to claim 73, in which encrypting and decrypting are carried out if said identifying information is absent.

76. The method according to claim 70, wherein said unchangeable key is already placed in said device.

77. The method according to claim 70, wherein said unchangeable key is generated in said device.

78. The method according to claim 70, wherein said unchangeable key is supplied externally from said device.

79. The method according to claim 76, 77 or 78, wherein said unchangeable key is specific to said device.

80. The method according to claim 76, 77 or 78, wherein said unchangeable key is not specific to said device.

81. An apparatus for protecting digital data from illegitimate use, said apparatus comprising:
  determining means for determining whether said digital data is subject to be protected or not;
  means for encrypting said digital data, determined being subject to be protected, using an unchangeable key to produce unchangeable key encrypted digital data, wherein said unchangeable key is capable of being operationally unchangeable at least during said encrypting of said digital data;
  means for storing, copying and/or transferring said unchangeable key encrypted digital data;
  means for decrypting said stored, copied and/or transferred unchangeable key encrypted digital data to said decrypted digital data; and
  means for utilizing said stored, copied and/or transferred unchangeable key encrypted digital data and said decrypted digital data.

82. The apparatus of claim 81 wherein said unchangeable key is located in a device.

83. The apparatus according to claim 81, wherein encrypting and decrypting using said unchangeable key are carried out by software executed by a computer.

84. The apparatus according to claim 81, wherein encrypting and decrypting using said unchangeable key are carried out by hardware.

85. The apparatus according to claim 81, wherein encrypting and decrypting using said unchangeable key are controlled by identifying information which is added to said digital data.

86. The apparatus according to claim 81, wherein encrypting and decrypting are carried out if said identifying information is present.

87. The apparatus according to claim 81, wherein encrypting and decrypting are carried out if said identifying information is absent.

88. The apparatus according to claim 82, wherein said unchangeable key is already placed in said device.

89. The apparatus according to claim 82, wherein said unchangeable key is generated in said device.

90. The apparatus according to claim 82, wherein said unchangeable key is supplied externally from said device.

91. The apparatus according to claim 88, 89 or 90 wherein said unchangeable key is specific to said device.

92. The apparatus according to claim 88, 89 or 90 wherein said unchangeable key is not specific to said device.

* * * * *

UNITED STATES PATENT AND TRADEMARK OFFICE
CERTIFICATE OF CORRECTION

| | |
|---|---|
| PATENT NO. | : 7,093,295 B1 |
| APPLICATION NO. | : 09/806510 |
| DATED | : August 15, 2006 |
| INVENTOR(S) | : Makoto Saito |

It is certified that error appears in the above-identified patent and that said Letters Patent is hereby corrected as shown below:

Col. 35 line 4 at Claim 40, line 4, "claim 31 or 34" should be changed to --claim 31 or 33--

Signed and Sealed this

Twenty-second Day of May, 2007

JON W. DUDAS
*Director of the United States Patent and Trademark Office*